United States Patent
Lepman

(10) Patent No.: US 7,882,137 B2
(45) Date of Patent: Feb. 1, 2011

(54) PROCESS FOR DETERMINING OBJECT LEVEL PROFITABILITY

(76) Inventor: Richard Tad Lepman, 04610 M-66 Highway North, Charlevoix, MI (US) 49720-9516

( * ) Notice: Subject to any disclaimer, the term of this patent is extended or adjusted under 35 U.S.C. 154(b) by 134 days.

(21) Appl. No.: 12/401,101

(22) Filed: Mar. 10, 2009

(65) Prior Publication Data
US 2009/0192883 A1 Jul. 30, 2009

Related U.S. Application Data

(60) Division of application No. 11/354,798, filed on Feb. 15, 2006, now Pat. No. 7,596,521, which is a continuation of application No. 09/545,628, filed on Apr. 7, 2000, now abandoned.

(60) Provisional application No. 60/128,769, filed on Apr. 9, 1999.

(51) Int. Cl.
*G06F 7/00* (2006.01)
*G06Q 40/00* (2006.01)

(52) U.S. Cl. .................. 707/793; 707/944; 707/950; 705/35

(58) Field of Classification Search ................. 707/713, 707/719, 731, 736, 737, 760, 769, 790, 793, 707/802, 944, 950, 999.104; 705/35, 36 R, 705/37, 38; 709/206, 217, 219, 23
See application file for complete search history.

(56) References Cited

U.S. PATENT DOCUMENTS

| | | | | |
|---|---|---|---|---|
| 6,148,293 A | * | 11/2000 | King | 705/35 |
| 6,981,023 B1 | * | 12/2005 | Hamilton et al. | 709/206 |
| 7,596,521 B2 | * | 9/2009 | Lepman | 705/35 |

* cited by examiner

*Primary Examiner*—Andrew Joseph Rudy
(74) *Attorney, Agent, or Firm*—Kelly Lowry & Kelley, LLP

(57) ABSTRACT

A process for determining object level profitability includes the steps of (1) preparing information to be accessed electronically, (2) establishing rules for processing the prepared information, (3) calculating at least one marginal value of profit using established rules as applied to a selected set of prepared information, (4) calculating a fully absorbed value of profit adjustment using established rules as applied to the selected set of prepared information, and (5) combining the at least one marginal value of profit and fully absorbed value of profit adjustment to create a measure for object level profitability. The inventive process gives management profit measures tailored to its need for accurate decision oriented profit information required to manage a large organization based on profit measurement.

30 Claims, 12 Drawing Sheets

DPM Example

Airtime Database Schema
Entity         Attributes
               ===>>>

| Plane | row_id | plane_id | orig_bal | et_orig_ba | p-orig_b | mp_net_ba | to_last_12 | rs_last_1 | no_seats 1 | no_seats 2 | no_seats 3 | teg | ... |
|---|---|---|---|---|---|---|---|---|---|---|---|---|---|

| Flight | row_id | flt_id | t_originatio | pt_landing | 1st_fare | 2nd_fare | 3rd_fare | schd_hours | distance | lliance_re | ins_fac | risk_factor | ... |
|---|---|---|---|---|---|---|---|---|---|---|---|---|---|

| Customer | row_id | cust_id | loyalty_rtng | ene_miles | or_score | alliance | ... |
|---|---|---|---|---|---|---|---|

| Employee | row_id | emp_id | salary&be | ... |
|---|---|---|---|---|

| Financial | row_id | finan_id | period_am | fin_name | period | type | ... |
|---|---|---|---|---|---|---|---|

| Transactions | row_id | tran_id | trn_amt | seat | fit | date | type | ... |
|---|---|---|---|---|---|---|---|---|

| Treatment rts | row_id | treatment_id | 25_yr_rate | pool_rt | ... |
|---|---|---|---|---|---| grouping tables:

| emp_to_flt_dt | row_id | emp_id | flt_id |
|---|---|---|---|

| cust_to_tran | row_id | cust_id | tran_id |
|---|---|---|---|

| cust_to_seat | row_id | cust_id | seat_id | flt_id |
|---|---|---|---|---|

| plane_to_flight | row_id | plane_id | flt_id | date |
|---|---|---|---|---|

| loc_to_gnd_cst | row_id | loc_id | finan_id |
|---|---|---|---|

FIG. 14

PROCESS FOR DETERMINING OBJECT LEVEL PROFITABILITY

RELATED APPLICATION

This application is a continuation application of U.S. patent application Ser. No. 09/545,628, filed Apr. 7, 2000, which claims priority from provisional patent application Ser. No. 60/128,769, filed Apr. 9, 1999 This is a division of co-pending U.S. Ser. No. 11/354,798, filed Feb. 15, 2006.

BACKGROUND OF THE INVENTION

The process of measuring profit is an important business activity. Profit measures are the primary basis for understanding financial performance and value creation in a business. Once a business is owned publicly, an independent review of a firm's financial position becomes a mandatory process well known as measuring profit according to "generally accepted accounting principles" (GAAP.) While these standards and regulations are adequate for an external view of a company's financial condition, the measurement of profit contribution amongst the business is required for proper management of the franchise. Internal financial performance measurement is especially complex for a multi-product, multi-location, and/or large customer based businesses. The use of internal financial performance measures drives most businesses planning processes, management incentive processes and control processes. Many businesses have found that internal profit measures can be consistent with the external financial statement measures. These businesses implement internal accounting processes consistent with external measures using common metrical units similar to a GAAP Financial Statement presentation—a consistent metric or "yard stick" (i.e. numerically the sum-of-the-profit-parts equals the whole company's profit according to GAAP.)

Many businesses today are struggling to accurately measure profit contribution at a level necessary to accurately measure profit contribution of individual customer interactions. The reason for dilemma is found in the manner in which generally accepted accounting principles are applied. Fundamental accounting theory takes lumpy cash flows that occur in the day-to-day management of a business conducted with its customers and transforms them into smoothed income or expense items (known as accruals.) At the end of every profit reporting cycle these income and expense items are consolidated into a period end balance sheet and income statements. Reports on the state of the business can then be presented by accountants in formats necessary for the independence of ownership and management that is the basis of capital markets. Indeed, most businesses today would call its accounting process critical for survival. Unfortunately, the complexity of maintaining an accurate financial accounting process has obscured the measurement of profit contribution at a very detailed level. While the aggregate cash flows of a large company are relatively stable the individual customer-to-business cash flows are very volatile. Accounting practice to date has been comfortable with using aggregate cash flow information for the accrual accounting process (10), as illustrated in FIG. 1. The accounting process based on aggregates has lead to blindness by businesses of incremental customer profit contribution measures necessary to implement customer level decision making, particularly in large businesses with many millions of customers.

General Ledgers (double entry book keeping systems) (11) were early adapters of automated data processing solutions due to the match between computing capabilities of computers and the execution of the accounting process. The benefit, from reduced cost for accounting processes easily justified large expenditures in information processing technology, both in hardware and in software development. The complexity of today's general ledger applications and the age of these systems have retarded the innovation of new automated techniques taking advantage of technological advances in massively parallel computing capability.

References describing generally accepted accounting principles and financial performance measurement procedures are listed below, and are incorporated by reference herein:

The money market, Marcia Stigum. 3rd ed. Homewood, Ill.: Dow Jones-Irwin, c 1990.

Money market and bond calculations, Marcia Stigum and Franklin L. Robinson. Chicago: Irwin Professional Publ., c 1996.

Money market calculations: yields, break-evens, and arbitrage, Marcia Stigum, in collaboration with John Mann. Homewood, Ill. Dow Jones-Irwin, c 1981.

The money market: myth, reality, and practice, Marcia Stigum. Homewood, Ill.: Dow Jones-Irwin, c 1978

Quantifying the market risk premium phenomenon for investment decision making: Sep. 26-27, 1989, New York, N.Y., Keith P. Ambachtsheer . . . [et al.]; edited by William F. Sharpe and Katrina F. Sherrerd; sponsored by the Institute of Chartered Financial Analysts. Charlottesville, Va.: CFA: May be ordered from Association for Investment Management and Research, c 1990

Fundamentals of investments, Gordon J. Alexander, William F. Sharpe, Jeffery V. Bailey. 2nd ed. Englewood Cliffs, N.J.: Prentice Hall, c 1993.

Microeconomics, Richard G. Lipsey. [et al.]. 9th ed. New York: Harper & Row, c 1990.

Economics of the firm: theory and practice, Arthur A. Thompson, Jr., John P. Formby. 6th ed. Englewood Cliffs, N.J.: Prentice Hall, c 1993.

The FASB conceptual framework project, 1973-1985: an analysis, Pelham Gore. Manchester, UK; New York: Manchester University Press; New York, N.Y., USA: Distributed exclusively in the USA and Canada by St. Martin's Press, c 1992.

Statement of financial accounting standards no. 5: impact on corporate risk and insurance management, Robert C. Goshay. Stamford, Conn.: Financial Accounting Standards Board of the Financial Accounting Foundation, 1978.

Common cents: the ABC performance breakthrough: how to succeed with activity-based costing, Peter B. B. Turney. Hillsboro, Oreg.: Cost Technology, 1991.

A guide to the SQL standard; a user's guide to the standard relational language SQL, Date, C. J. Addison-Wesley Pub. Co., 1987.

Accountants SEC practice manual, Kellogg, Howard L.: Commerce Clearing House, 1971.

Risk theory; the stochastic basis of insurance, Beard, R. E. (Robert Eric): 3rd ed., Chapman and Hall, 1984.

Practical risk theory for actuaries, Daykin, C. D. (Chris D.): 1st ed., Chapman & Hall, 1994.

Actuarial mathematics: 2nd ed., Society of Actuaries, 1997.

Objectives and concepts underlying financial statements/ United Nations, 1989.

Cost accounting for factory automation/National Association of Accountants, 1987.

Interest rate risk models; theory and practice: Glenlake Publ. Co.-Fitzroy Dearborn, 1997.

Economic analysis for management decisions, Elliott, Jan Walter: R. D. Irwin, 1973.

Microeconomic theory, Ferguson, C. E. (Charles E.): 4th ed. R. D. Irwin, 1975.

Planning and measurement in your organization of the future, Sink, D. Scott.: Industrial Engineering and Management Press, 1989.

Economics, Paul A. Samuelson, William D. Nordhaus. 16th ed. Boston, Mass.: Irwin/McGraw-Hill, c 1998.

Setting intercorporate pricing policies, Business International Corporation, New York: Business International Corporation, 1973.

Controversies on the theory of the firm, overhead allocation, and transfer pricing, Murry C. Wells, editor. New York: Arno Press, 1980.

The transfer pricing problem: a theory for practice, Robert G. Eccles. Lexington, Mass.: Lexington Books, 1985.

Transfer pricing, Clive R. Emmanuel and Messaoud Mehafdi. London; San Diego: Academic Press, 1994.

Internal transfer pricing of bank funds, by Valerie Giardini. Rolling Meadows, Ill.: Bank Administration Institute, 1983.

Transfer pricing: economic, managerial, and accounting principles, by Clark J. Chandler . . . [et al.] Washington, D.C.: Tax Management, Inc., 1995.

International intracorporate pricing; non-American systems and views, Jeffrey S. Arpan. New York, Praeger Publishers, 1971.

There remains, however, a need to resolve profit measures at a detailed level without using analytical models or statistical extrapolation. Such a process should utilize rule driven and data base measurement processes which will give large scale businesses a lower cost of maintenance and a technologically scalable tool to measure profit at a level of precision or resolution not possible in prior financial performance measurement processes. The present invention fulfills this need and provides other related advantages.

SUMMARY OF THE INVENTION

Prior approaches to management's desire for an accurate measure of individual decisions (incremental or marginal) profit impact have been solved by automating the accounting process for implementing accounting methods. Cash flows are transformed into two parts, a debit part or credit part, according to an accounting rule. Other non-cash accounting rules are implemented to create "accrual" debits and credits smoothing income and expenses and adjusting for future contingencies. (see Management Accounting Theory books or any source of accounting theory, where the balance sheet equation and the consolidation process, the combination of flows and stocks of financial data, are developed.) The first large scale use of automated computing technology is frequently found to be the automation of the financial control or accounting processes, since it is easy to develop software to implement accountancy rules and there were large benefits in staff productivity easily observable. For businesses to observe marginal profit contributions it was necessary to use accounting information and make reasoned conclusion on how to apportion or extrapolate this information into incremental customer, product or organizational profit detail. (See FIG. 1)

What these methods of profit measurement lack are the adequate level of detail to measure an individual or incremental decision's impact on profit. To gain this new level of profit resolution this invention is designed to use micro profit measurement rules applied at a granular level consistent with standard accounting practice using a combination of actuarial science and mathematical set theory. The invention is designed to utilize massively parallel computing operations using relational database management techniques enabling profit measurement at a level not available today in a large individual customer scale business. This invention does this through a consistent application of measures to a class of business entities which represent the smallest common component of profit measurement desired—the Profit Object.

The invention's method of apportionment of non-object related profit measures specifies a method which will not change the ordinal or cardinal profit contribution ranking when only marginal profit measures are counted. This specification is what makes it possible to apply marginal measurement rules (see Micro-economic theory literature) with macro economic principles; namely the sum-of-the-parts equals the whole criterion which is the basis of financial accounting theory and practice.

The invention decomposes profit measurement analytical calculations into five classifications:

1. Marginal profit measures associated with use of the business' balance sheet resources;

2. Marginal measures of non-balance oriented revenues;

3. Marginal cost measures;

4. Marginal measures of expected costs or revenues; and,

5. Apportioned cost measures.

This classification provides for additive profit measures across the five components. The calculation process is designed to be independent across classes 1, 2, 3, & 4 above with the addition of class five to preserve sum-of-the-parts integrity without simultaneous calculations typically found in profit measurement processes. When all five profit measures are summed at the lowest level of profit detail, a consistent set of profit values for all types of aggregations are possible—all profit measurement then originates from the same point in a profit database. The simultaneous use of these five analytical frameworks makes possible a detailed level of profit calculation consistent with GAAP.

In particular, the present invention relates to a process for determining object level profitability. In its basic form the process includes the steps of:

1. Preparing information to be accessed electronically;

2. Establishing rules for processing the prepared information;

3. Calculating at least one marginal value of profit using established rules as applied to a selected set of prepared information;

4. Calculating a fully absorbed value of profit adjustment using established rules as applied to the selected set of prepared information; and, 5. Combining the at least one marginal value of profit and fully absorbed value of profit adjustment to create a measure for object level of profitability.

More specifically in the step of preparing information to be accessed electronically, the database is prepared, object attributes are extracted, conditioned and loaded into the database, and financial statement attributes are extracted, conditioned and loaded into the database. If desired the step may also include extracting, conditioning and loading the event attributes into the database, and calculating funds transfer treatment rates.

In the step of establishing for processing the prepared information for rule establishment providing the information necessary to select objects and perform the correct profit calculus is accomplished. The step of calculating at least one marginal value of profit using established rules as applied to a selected set of prepared information includes calculating net interest, other revenue, direct expense, and/or provision for the selected set of prepared information. Net Interest (NI) is the summation of interest income, value of funds provided and earnings on equity funds used less the sum of interest expense and cost of funds used. Other Revenues (OR) is a measure of profit contribution from non-interest related sources. Direct Expense (DE) is the profit value reduction due to marginal resource consumption by the object. Provisioning (P) is the expected profit value adjustment for future outcomes related to the object.

The step of fully absorbed profit adjustment, Indirect Expense (IE), is an apportioned profit value adjustment for all non-object related resource consumption by the business.

In the step of combining the five profit values, NI+OR−DE−P−IE, may be adjusted for taxes and/or object economic value.

The foregoing elements of the invention, which have been explained at a micro elemental level can be advantageously employed in massive amounts and parallel process power. For example, in the macro perspective of the invention the basic steps can be utilized.

The present invention gives management profit measures tailored to its need for accurate decision oriented profit information required to manage a large organization based on profit measurement. This invention gives businesses the ability to resolve profit measures at a level of detail necessary for all types of application of profit oriented performance measurement.

Other features and advantages of the present invention will become apparent from the following more detailed description, taken in conjunction with the accompanying drawings which illustrated, by way of example, the principles of the invention.

BRIEF DESCRIPTION OF THE DRAWINGS

The accompanying drawings illustrate the invention. In such drawings:

FIG. 14 shows a partial relational database schema for an airline industry example.

DETAILED DESCRIPTION OF THE PREFERRED EMBODIMENT

As shown in the accompanying drawings for purposes of illustration, the present invention is concerned with a detail profit metric (DPM) designed to be a computer database application (i.e. software) for profitability measurement. DPM's profit measurement system is fundamentally different from the common profit measurement system used by regulators and public accountancy—yet, it is consistent with generally accepted accounting principles.

Figure 1:
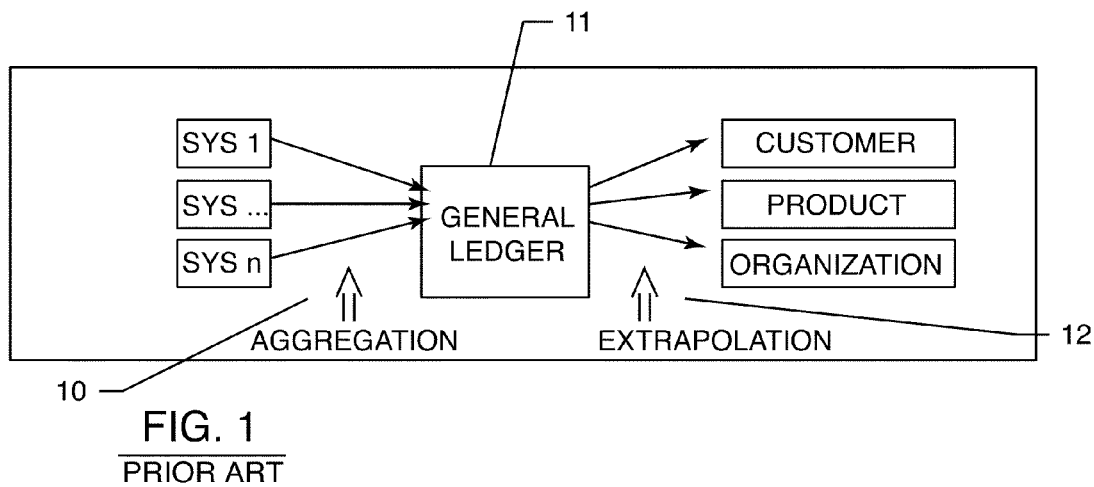
FIG. 1 shows existing profit calculation process flow.
Figure 2:
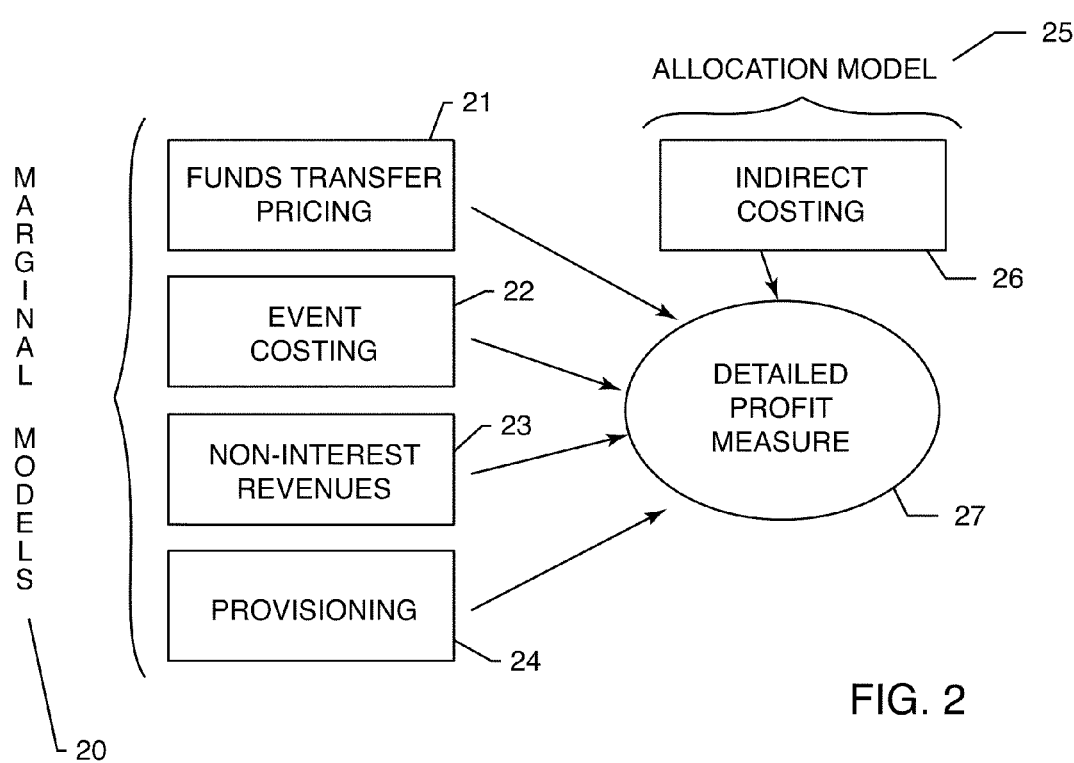
FIG. 2 shows analytical processing relationships.
Figure 3:
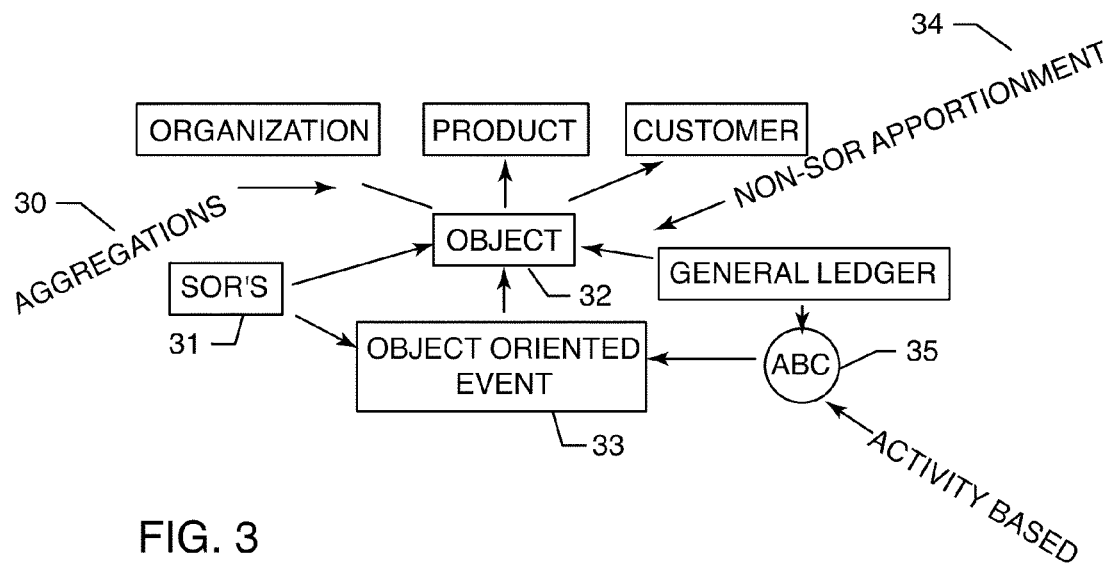
FIG. 3 shows the invention's information flow.

With reference now to FIGS. 2 and 3, the invention is designed to utilize massively parallel computing operations using relational database management techniques enabling profit measurement at a level not available today in a large individual customer scale business. This invention does this through a consistent application of measures (27) to a class of business entities (32) which represent the smallest common component of profit measurement desired—the Profit Object.

The invention's method of apportionment of non-object related profit measures (34) specifies a method which will not change the ordinal or cardinal profit contribution ranking when only marginal profit measures are counted. This specification is what makes it possible to apply marginal measurement rules with macro economic principles; namely the sum-of-the-parts equals the whole criterion which is the basis of financial accounting theory and practice.

As shown in FIG. 2, the invention decomposes profit measurement analytical calculations into five classifications:

1. Marginal profit measures associated with use of the business' balance sheet resources, also referred to as funds transfer pricing (21);

2. Marginal measures of non-balance oriented revenues, also referred to as non-interest revenues (23);

3. Marginal cost measures, also referred to as event costing (22);

4. Marginal measures of expected costs or revenues, also referred to as provisioning (24); and, 5. Apportioned cost measures and indirect costing, in accordance with an allocation model of the present invention (26).

This classification provides for additive profit measures across the five components. The calculation process is designed to be independent across classes 1, 2, 3, & 4 above with the addition of class five to preserve sum-of-the-parts integrity without simultaneous calculations typically found in profit measurement processes. When all five profit measures (49) are summed at the lowest level of profit detail, a consistent set of profit values for all types of aggregations (30) are possible—all profit measurement then originates from the same point in a profit database. The simultaneous use of these five analytical frameworks makes possible a detailed level of profit calculation consistent with GAAP.

FIG. 3 illustrates DPM data flow: where systems of record (SOR's) (31) data source object (32) and object oriented event (33) data; where General Ledger data sources apportionment data; and, where event and general ledger data are used with activity based costs (35). DPM is based on object level detail of cash flows, customer events and management profit allocations of profit arising from non-customer related events. More particularly, DPM is based on object level detailed data extracted from the SOR's (31), customer object oriented event data (33) and non-SOR Apportionments (34). DPM provides both marginally (20) and fully absorbed profit measures (25), something traditional "general ledger" based profit accounting systems cannot accomplish due to reliance on aggregate debit and credit amounts (10). The differences in measures are directly observable in comparisons of detailed customer (13), product (14) or organizational (15) profit values calculated using prior art (12) methods with profit values derived using aggregations (30) of object data, per FIG. 3.

Figure 4:
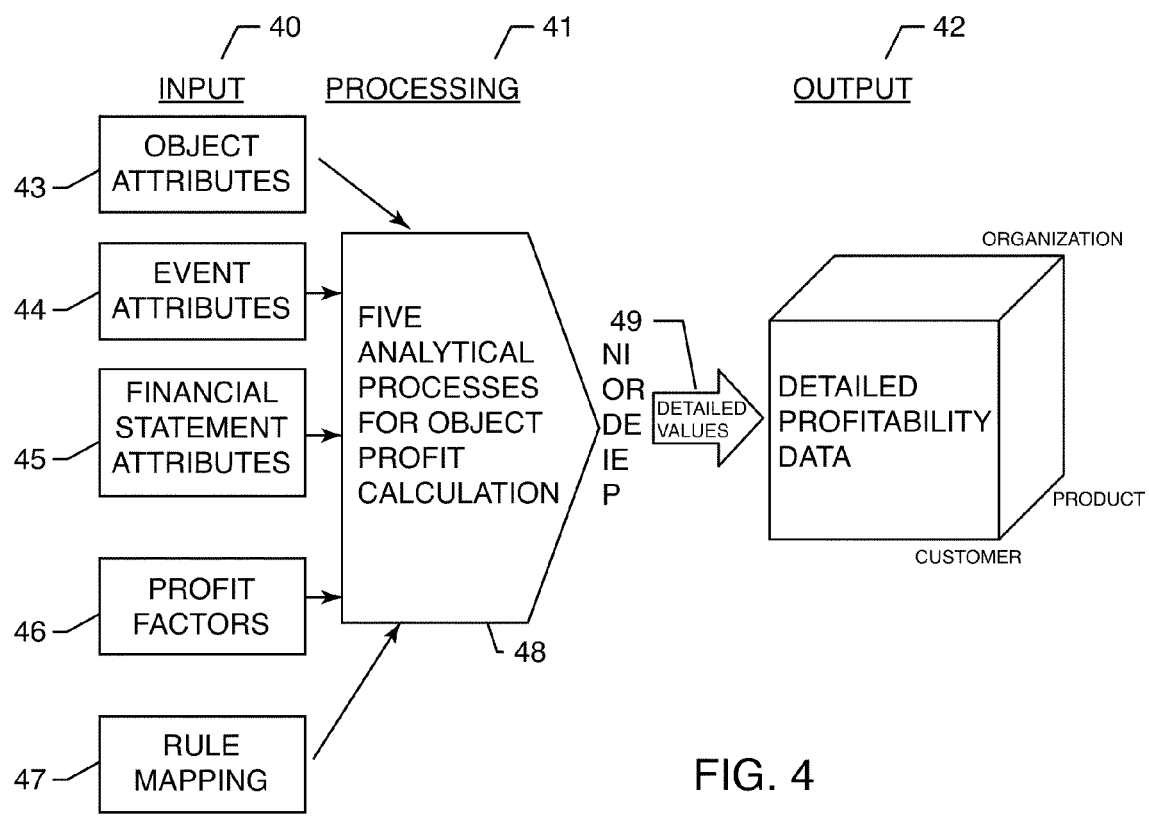
FIG. 4 shows the invention's data relationships.

More specifically, with reference to FIG. 4, in the step of preparing information to be input (40) to be accessed electronically, a database is prepared. Object attributes are extracted, conditioned, and loaded into the database (43), and financial statement attributes are extracted, conditioned and loaded into the database (45). If desired, the method may also include extracting, conditioning and loading the event attributes into the database (44) and calculating funds transfer treatment rates and activity based costing rates (46).

In the step of establishing for processing (41) the prepared information on how to select objects and perform the correct profit calculus rule mapping (47) is accomplished. The step of calculating (48) at least one marginal value of profit using established rules as applied to a selected set of prepared information includes calculating net interest (NI), other revenue (OR), direct expense (DE), and/or provision for the selected set of prepared information. Provisioning (P) is expected profit value adjustment for future outcomes related to the object. The step of fully absorbed profit adjustment, indirect expense (IE), is an apportioned profit value adjustment for a non-object related resource consumption by the business. The foregoing elements of the invention, which have been explained at a micro-elemental level, can be advantageously employed in massive and parallel processing power (41). The present invention gives businesses the ability to resolve profit measures at a level of detail (49) necessary for all types of applications of profit oriented performance measurement or detailed profitability data as an output (42) for enabling aggregation (30) to a particular customer, product or organization within a business.

The following is a definition of the inputs (attributes or measurement parameters), the method of processing and the output of the DPM process.

DEFINITIONS

Object Attributes (43)

These are data about the object being measured. Different businesses have different objects of detailed profit measurement. Examples of profit measurement objects include an airline using "seat" as the profit object, an insurance company using a "policy" object or a bank using an "account" object—these objects represent the lowest level of detail required to support consistent internal multi-dimensional internal profit analyses. Types of data attributes associated with these objects include: balances, rates (or interest accrued), product identification, exposures, expected loss frequency, and various dates (e.g., start, finish, rate reset, last payment, next payment, life, etc.)

Event Attributes (44)

These data are about events (a resource consuming activity) related to the object being measured. Data found here include object identification, transaction amounts, quantities, event location, event time, counter-party identification, event type (e.g., payments, interest paid or earned, purchases, refunds, etc.) At least one of these attributes must relate the event to at least one Object.

Financial Statement Attributes (45)

These are data about the company's financial statement. Data found here include balance sheet and profit statement amounts usually aggregated by the legal or management entities that own a group of objects being measured. These data will be current accounting period either actual or planned.

Profit Measurement Parameters (46)

These data include parameter values necessary to perform the object or event level profit calculations. The major classifications of these data are:

Funds valuing rates ("Treatment Rates")—DPM's funds transfer pricing method uses maturity opportunity rates used in valuing each object's marginal use or source of internal funds (balance sheet resources).

Unit Costs—DPM's Direct Expense calculations require unit cost parameters. DPM can calculate unit costs, when unit cost data are not available; in these instances, if the total cost is provided a financial statement attribute and then unit cost is derived by dividing total cost by an appropriate attribute quantity amount.

Allocated Amounts—In both Other Revenue and Indirect Expense calculations this amount is apportioned amongst all objects in a group.

Miscellaneous Calculation Values—Some of DPM's calculations require non-system of record values. For example, number of days in profit measurement period or equity allocation weighting. These values are known as "modeling" parameters.

Amortization Parameters—Interest amortization requires an interest rate and expected life attributes. Straight line and declining balance methods of amortization require expected life values.

Expected Profit Adjustment Measurement Parameters—Provision calculations require appropriate attributes, such as: expected loss rates, reserve percentages, exposure factors, recovery rates, default probabilities and collection costs.

Tax Rates—Tax rates are required for after-tax profit calculation. DPM is designed to calculate pre-tax income on a taxable equivalent basis (where an single effective tax rate is all that is required to transform pre-tax income into after tax earnings.)

Profit Measurement Rule Specification

DPM's processing approach is to combine profit measurement techniques with (non-modeled) data and calculation parameters. Each application of this calculus is called a rule (47). DPM is designed to allow the user the freedom to associate a group of objects with a rule and to use object-level information in combination with rule parameters to calculate profit values. The DPM invention uses profit measurement rules separate from, but applied to, object data and the use of relational database concepts, giving the user flexibility in both the assignment and depth of definition of measurement rules and measurement resolution. Use of this method is especially suited for massively parallel computing technology where linear scaleable capital investment in processing technology is possible vis-à-vis object and event count and rule complexity.

The types of calculation (Rule types) are:

Funds Treatment—Every object with cash flows affecting a financial statement's balance sheet requires a method of valuing an object's use or source of funds. The common name for this approach to valuing is know as "Matched Maturity Funds Transfer Pricing." DPM uses a canonical representation an object's funding characteristics for computational performance. DPM's methodology requires effective yield adjustment to eliminate the allocation of interest payable/receivable required by GAAP. A value, based on effective yield adjusted market price (the yield curve), is then determined by DPM for each instance that requires an interest rate transfer pricing to calculate an object's marginal Net Interest (NI).

Equity Allocation—In order for precise net interest revenue or economic value adjusting calculations the amount of equity funds required at an object level must be determined. DPM's equity allocation to the object level calculations may use any of the following methods: simple ratios; regulatory definitions; economic allocations based on econometric modeling (see book on Modern Portfolio Theory) methodologies; or, as statistically defined allocations.

Balance Sheet Allocations—Complete calculation of Net Interest may require an object level allocation of some financial statement balance sheet amounts.

Apportionment—In Other Revenue, Provision and Indirect Expense calculations are applied at the object level using Financial Statement Attributes which are not related directly to an object. These profit adjustments are made so that the sum of all object profit equals the whole enterprise's profit—an important property of DPM's output. Accountants refer to this profit measurement technique as "full allocation of profit." DPM's approach is to pool indirect costs and revenues and then apportion them. Apportionment rules specify how the pool is completely allocated to appropriate objects. DPM uses a specific closed form (mathematical formula that require only information known in the current period and no iterative computation) allocation rules.

Amortization—Some types of income or expense are deferred or accrued over multiple periods including and subsequent to the current accounting period. This is common to accrual accounting methods used in financial statement presentation and give rise to timing differences between cash flows and their related profit as presented in a financial statement in any accounting period. Since DPM is designed to mirror a financial statement's profit measure it must support deferral and accrual accounting principles. Amortization methods are included in DPM to reflect these GAAP concepts. DPM's amortization methods include: interest method of amortization (used for interest income and expense accruals and for deferral of fees that are in lieu of interest); and, straight line or declining balance amortization methods (used for cost or income deferrals and capitalized investment depreciation.)

Other Revenue Pricing—In situations where object and event activity can be used to derive object level income or fees DPM provides for the calculation of these drivers of profitability in Other Revenue profit calculations. These calculations take the mathematical form of a linear combination of event or object values and modeled coefficients.

Direct Expense—Calculation of object profit adjustment due to object related activity requires rules that take the form of linear combinations of event or object values and modeled coefficients.

Indirect Expense—In situations where expense apportionment or amortization amounts are aggregated the user may want different rules applied depending on the path (or dimension) of aggregation. These rules allow for multiple profit calculations rules to be applied to derive multiple object level indirect expense amounts.

Provision—Adjusting current profit for expected future value changes is known as "actuarial" provisioning. The technique is well known by the financial industry's accounting practice. DPM applies actuarial based methods in its object level profit calculations where the Provision pre-adjusts profit for contingent or known exposures to future profit.

Taxable Equivalent Gross-up—Profit is usually an after-tax measure. Some events or portions of some object profit may be excluded from normal taxation. DPM's approach is to adjust these pre-tax values so that a singular tax rate can be used to convert pre-tax profit into after-tax values, known as taxable equivalent adjustment. For the purpose of the remaining detailed description all profit and loss profit measures are tax equivalent amounts (e.g., TEG*Amount.) These rules use object and event attributes to drive an adjustment for each of the five classes of profit amounts to a taxable equivalent basis.

Interest Yield Adjustments—Since DPM can derive profit for any length of accounting period from daily to annual, the adjustment of cash interest payments and the financial statement's accrual or smoothed representation of interest related Profit, DPM requires a method for converting cash interest amounts to financial statement accrual amounts. DPM implements the mathematical concept of "effective interest rate" conversion to accomplish this type of calculation.

Before the calculation rules can be applied at the object or event level a calculation rule must be associated with an object, designating the methods DPM will use to calculate components of profit at the object level. An object grouping is designed to associate objects having common and defined set of object attributes for similar processing (note that a group may consist of one object). The association of a group of objects with a calculation rule is referred here as a Rule Map (47).

Inheritance Functionality

In nature the concept of inheritance is where a descendant receives properties of its predecessors, in computer science inheritance is defined in "Object Oriented" software development theory as the ability to increase function without loss of function using the same data. In DPM the concept of inheritance is applied and in essence it means that an implementation can change Rules (change profit calculus) without loosing any profit measurement capabilities of the preceding state(s). This feature allows DPM users a unique ability to apply techniques of differing levels of sophistication to different sets of objects according to the trade-off between the value of more accurate object-focused profit measures and the cost of obtaining and populating data and maintaining Rule Maps.

The DPM system is designed for Rules to be applied to any object without loss of integrity of output. This design feature allows the user to incrementally migrate objects to increased measurement precision as justified. This valuable piecewise increase in functionality is possible due to DPM's combination of rules and data in a mathematical set theoretic framework (41). This approach allows for a relational database management system implementation (42). It is nearly impossible develop and maintain procedural based software with as much flexibility and with the capability to simultaneously support the number of calculation permutations required by DPM.

Restatement Functionality

Since DPM is a rule based system the ability to restate prior period's Profit calculations are systematically possible providing historical data exists. DPM's design of object level profit measurement enables a unique historical profit restatement capability. Three features of DPM's restatement capability are:

1. Produces a mathematically consistent time series (i.e. no measurement bias) of object level Profit. DPM restatement functionality is designed to apply the same Rules to all available historical object or event level data.
2. DPM's restatement functionality preserves object accrual integrity when the object history is restated for different length accounting periods. Implementations of daily, weekly, monthly, quarterly, semi-annual, or annual profit calculations and mixing different periodicity in historical data without loss of analytical integrity.

3. Capable of object's profit history restatement. If a DPM user changes Rules or Rule Maps and/or changes the way a subset of object's Profit are calculated and if the historical data is available per the new set of Rules then the user can restate historical profit measures for these subset of objects.

Figure 5:
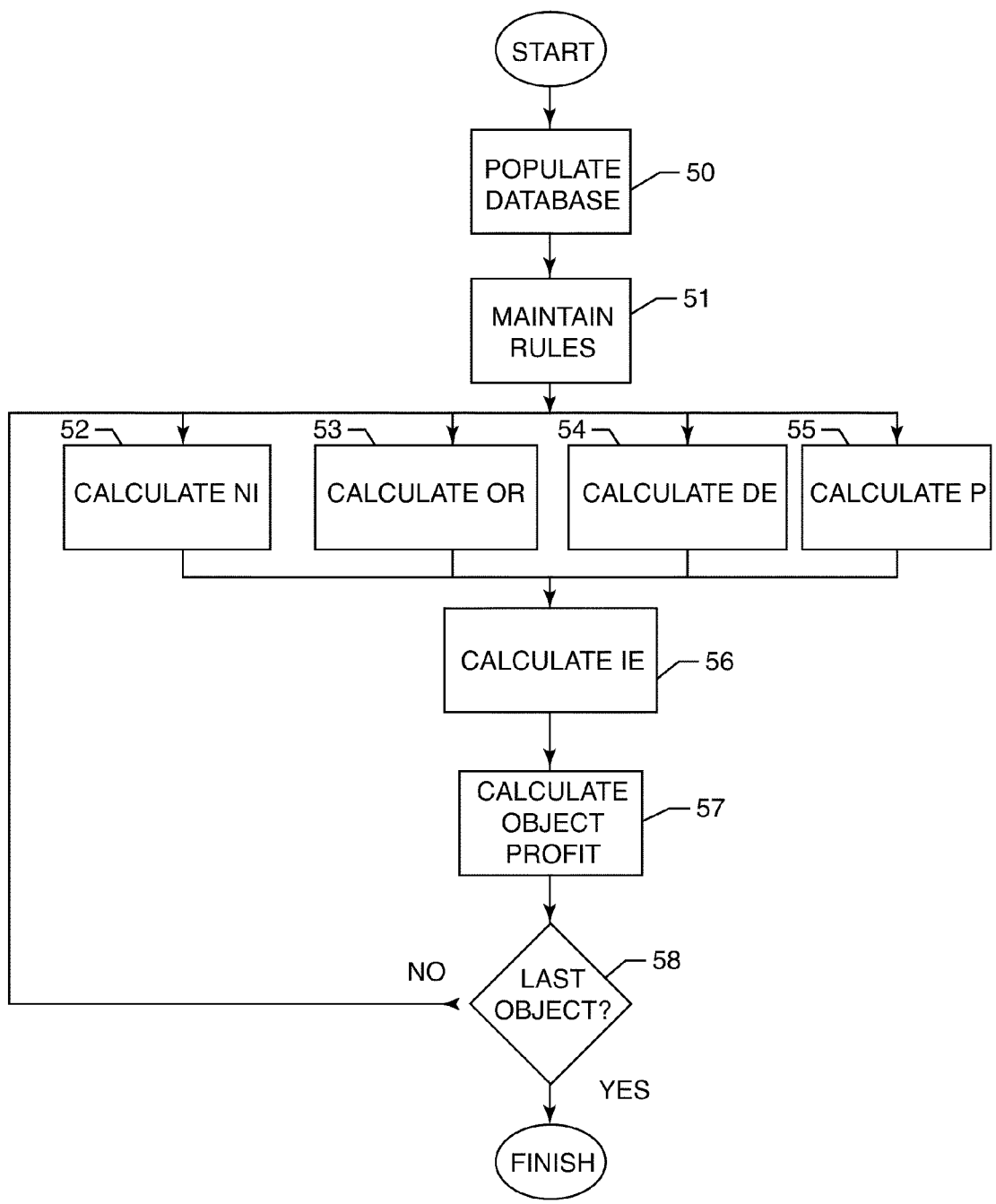
FIG. 5 shows the invention's process flow.
Figure 6:
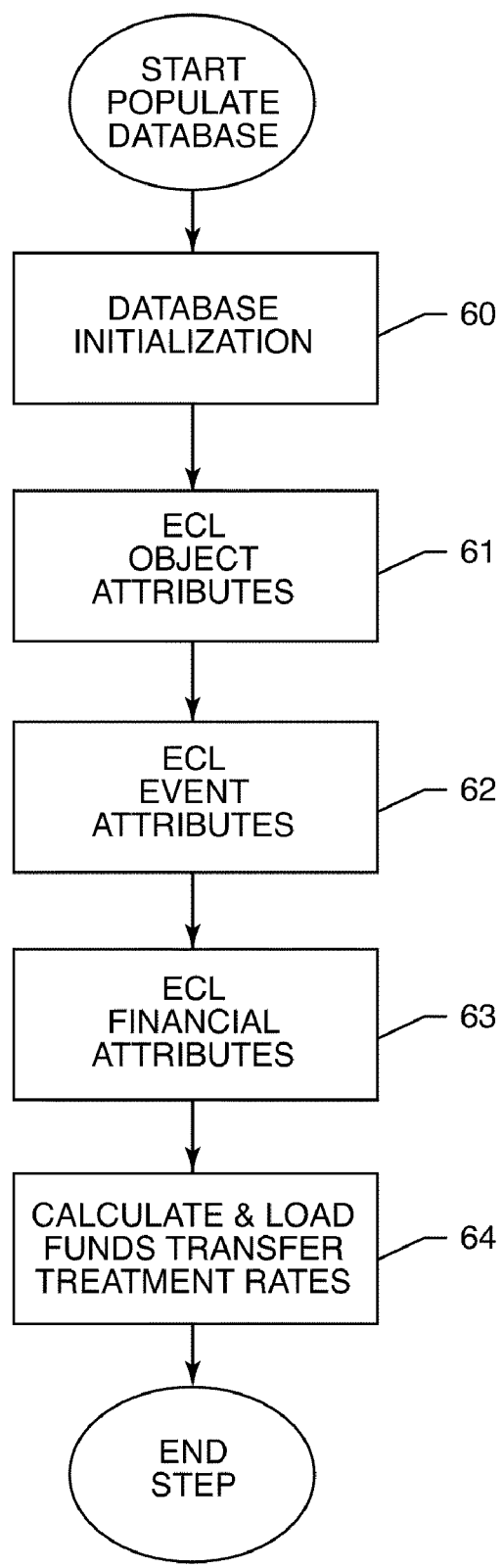
FIG. 6 shows the invention's database preparation process step detail.
Figure 7:
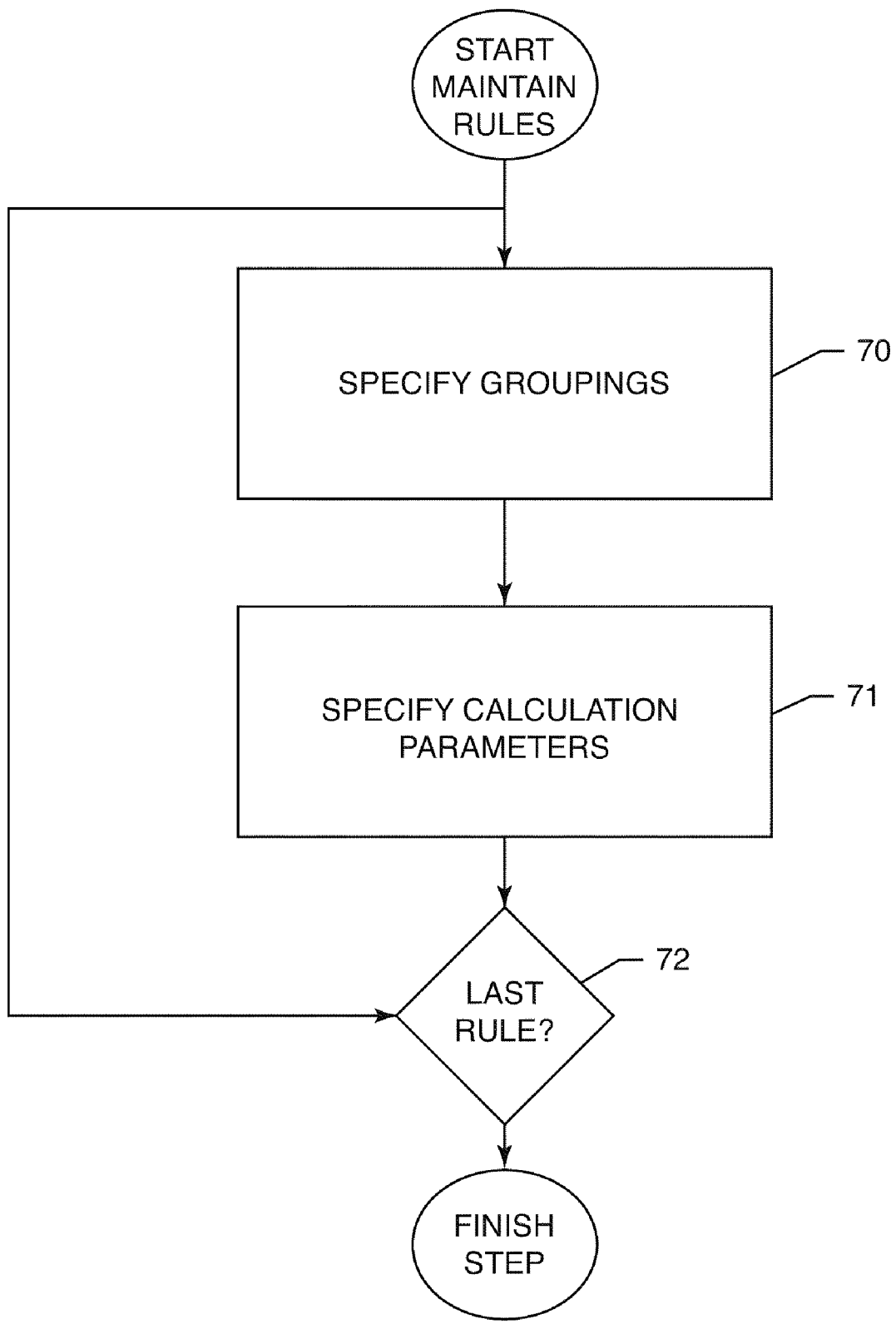
FIG. 7 shows the rule maintenance process.
Figure 8:
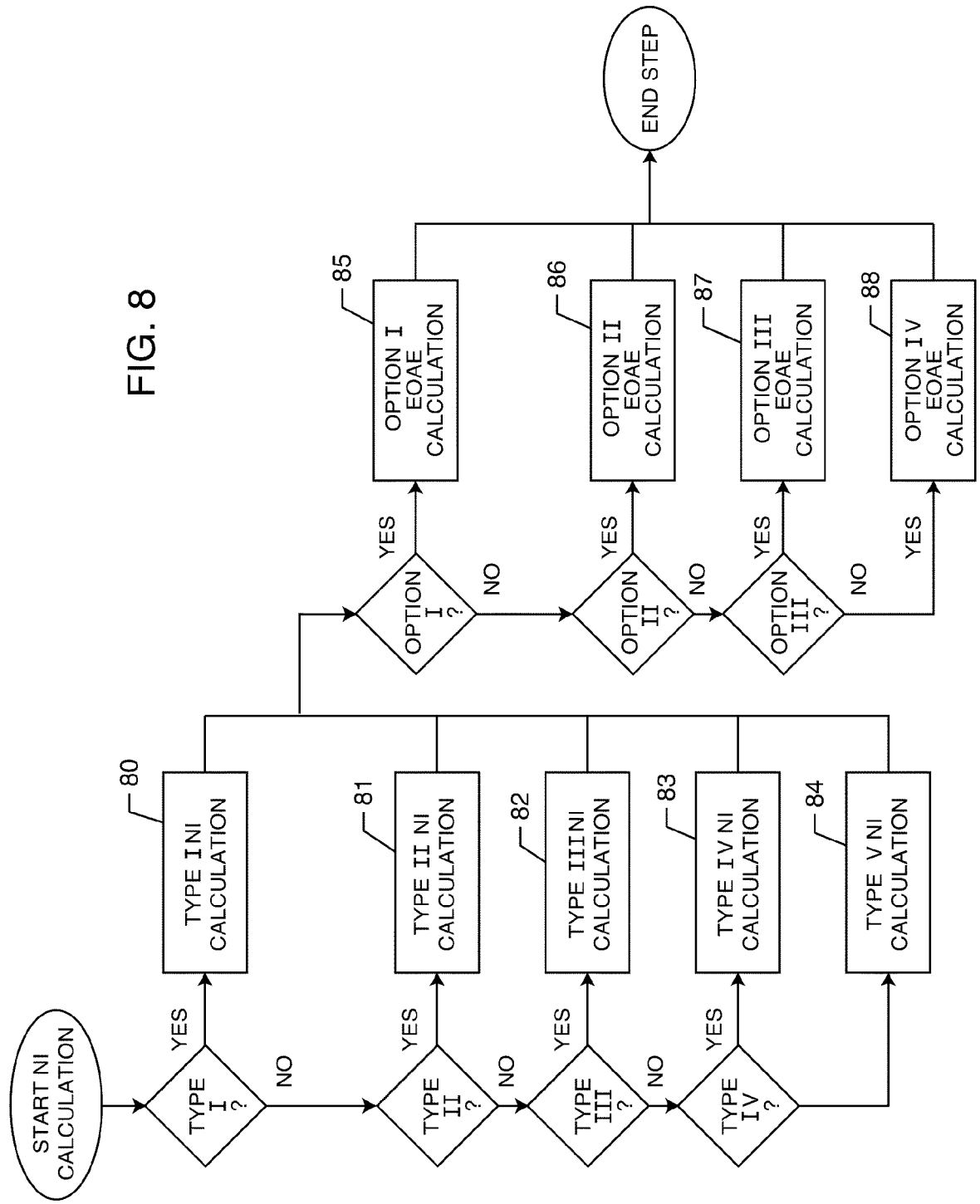
FIG. 8 shows the net interest measuring process.
Figure 9:
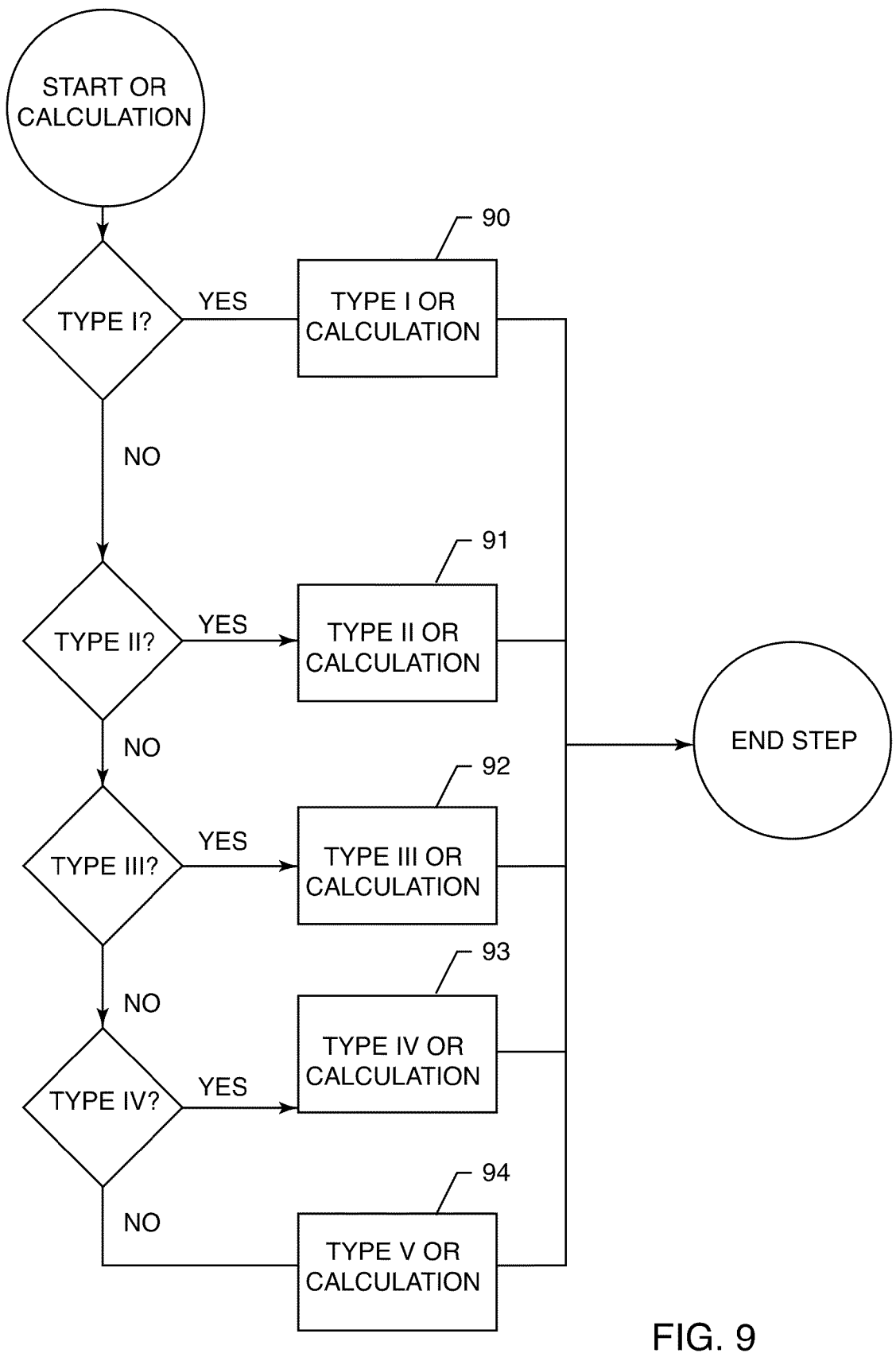
FIG. 9 shows the other revenue measuring process.
Figure 10:
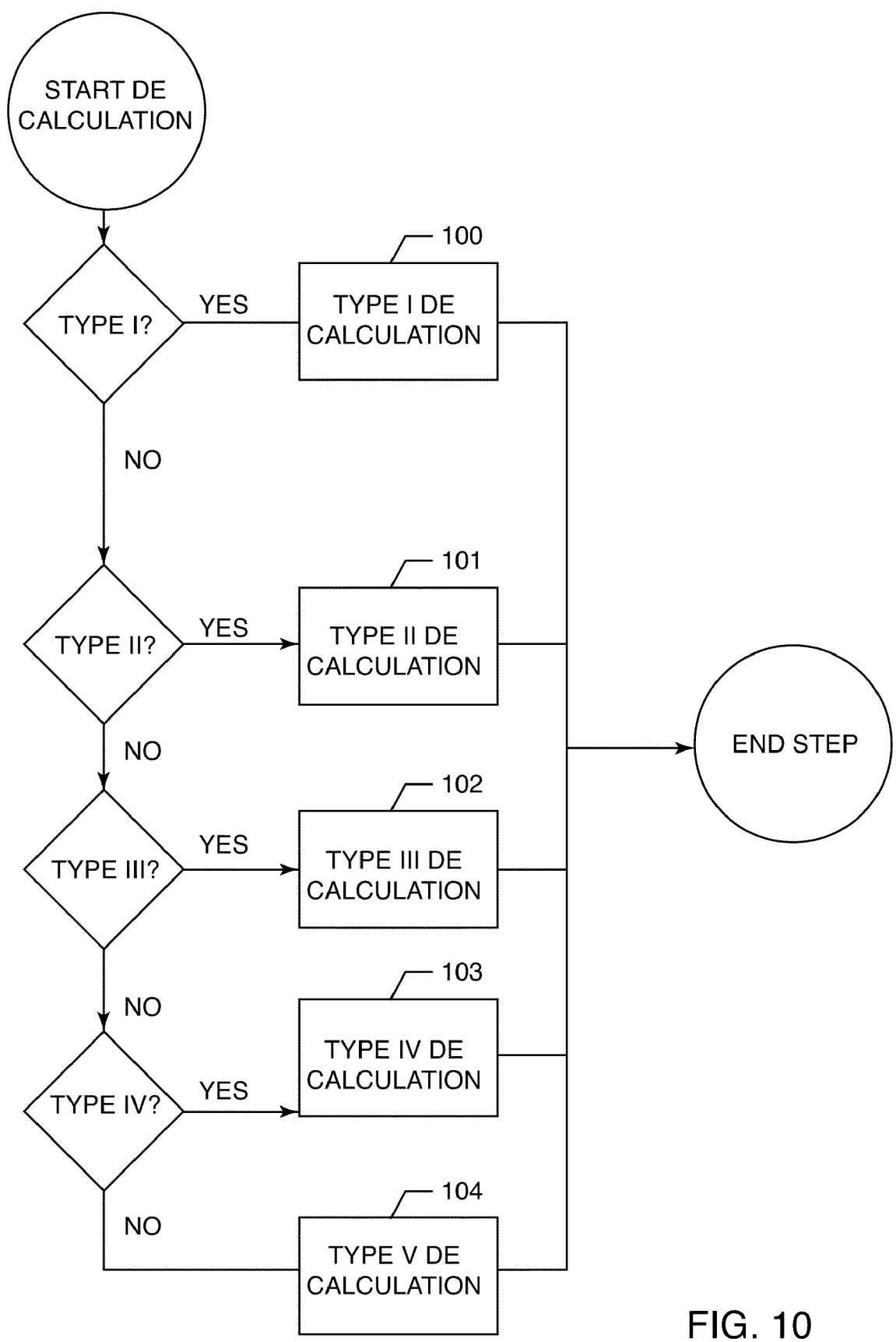
FIG. 10 shows the direct expense measuring process.
Figure 11:
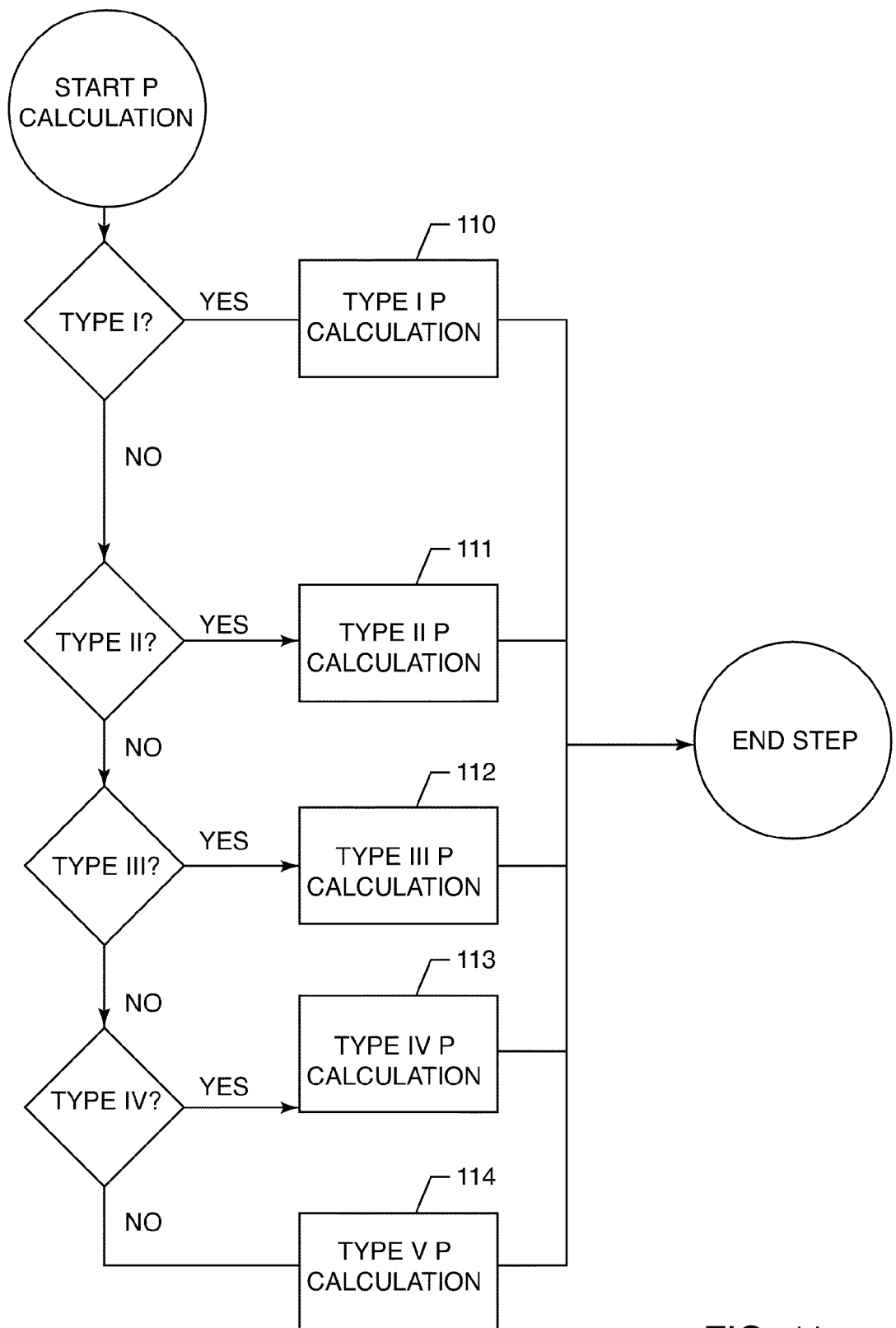
FIG. 11 shows the provision measuring process.
Figure 12:
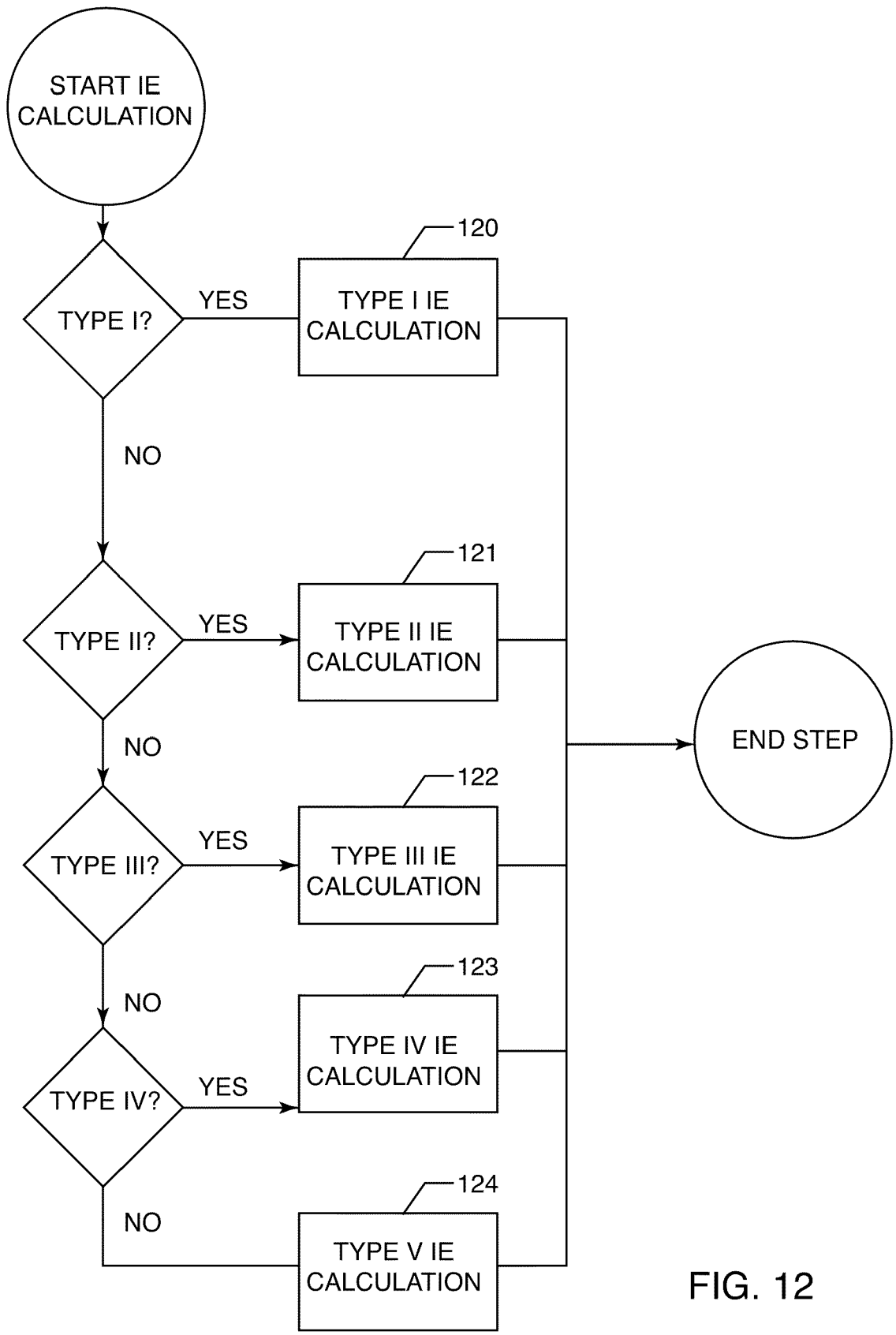
FIG. 12 shows the indirect expense measuring process.
Figure 13:
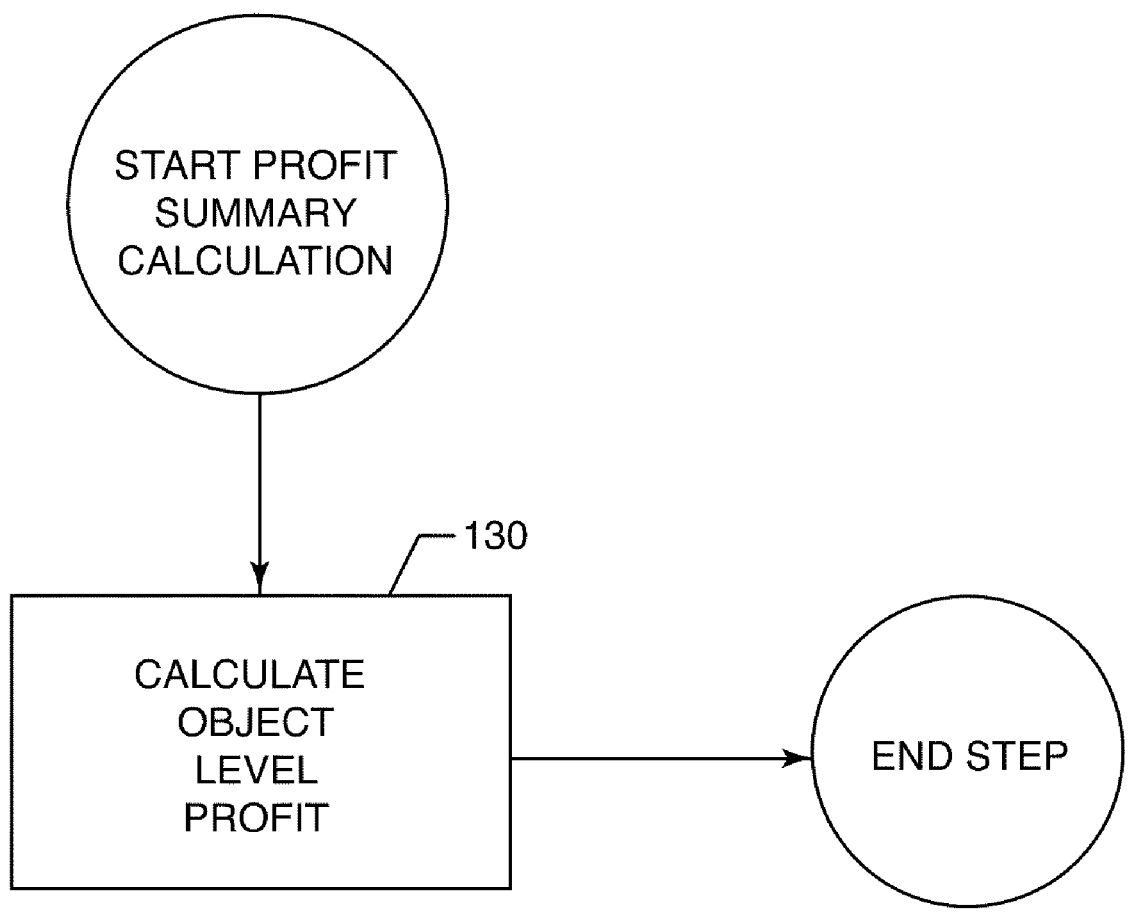
FIG. 13 shows the profit component aggregation and adjustment process.

Processing (See FIG. 5)

With reference to FIG. 5, the database is first populated (50). Rules are maintained (51), as will be more fully discussed herein, and the NI, OR, DE, and P are calculated (52-55). Next, the IE is calculated (56) to arrive at a calculation of the object profitability (57). This process is repeated for all objects. After the last object (58), the process is finished as the detailed profitability database is obtained. FIGS. 6-13 describe in more detail the steps taken in FIG. 5 in accordance with the present invention.

1. Populate Database (See FIG. 6)

Perform standard database administration actions to initialize data for the required calculations:

1. Perform database Initialization (60)

2. Extract, condition & load object attributes (61)

3. Extract, condition & load event attributes (62)

4. Extract, condition & load financial statement attributes (63)

5. Calculate and populate NI treatment rate attributes (64).

2. Maintain Object Groups and Rule Maps (See FIG. 7)

Populate or edit Rule parameters necessary to perform calculations. Rules definition is by association of specific, non-iterative calculation, as described below, a set of object or event attributes defined as a data filter (see Relational Data Base Management System textbooks). Rules have two pieces:

1. Parameters to drive the object selection or data filter for calculations (70); and, 2. Parameters specific to the appropriate calculation methodology (71).

An easy-to-use graphical user interface can be used to maintain these data for all rules (72).

The following processing steps, Steps 3 through 6 perform object and event level profit calculations. Steps 3, 4, 5, and 6 can be processed independently; step 7 requires values derived in step 3, 4, 5, and 6 and therefore occurs sequentially.

3. Calculate Net Interest for all Objects (See FIG. 8)

Net Interest is:

NI=Interest Income−Cost of Funds+Value of Funds−Interest Expense+Earning on Allocated Equity Correct interest rates for calculation of interest income or expense depend on the length of the profit measurement period. Using actuarial mathematical techniques the bookkeeping required by GAAP for interest receivables and Payables can be avoided in NI calculus. A known technique (see M Stigum, Money Markets) to accomplish this adjustment for profit measurement according to GAAP (i.e. accruals) the following calculation is used to convert interest rates:

Let
$r_{new}$=annualized rate with new compounding factor
$r$=annualized rate with old compounding factor
$m$=number of old compounding periods per year
$n$=number of new compounding periods per year Then $$r_{new} = \left[\left(1 + \frac{r}{m}\right)^{m/r} - 1\right] * n$$

Ni Calculation Rule Type I

The object balance is either an asset or a liability amount for Type I calculation.

Let
$AAB(o_i)$=Average Asset Balance of the object $o_i$
$ALB(o_i)$=Average Liability Balance of the object $o_i$
$rate_{asset}(o_i)$=Effective interest rate for object $o_i$ as an asset balance
$rate_{liability}(o_i)$=Effective interest rate for object $o_i$ as a liability balance
$Rt$=Treatment rate based on the identified treatment for the object's product attributes
Int Inc$(o_i)$=Interest Income of object $o_i$
COF$(o_i)$=Cost of funds used by object $o_i$
Int Exp$(o_i)$=Interest Expense for object $o_i$
VOF$(o_i)$=Value of funds provided by object $o_i$ Then, Int Inc$(o_i)$=AAB$(o_i)$*rate$_{asset}(o_i)$ {Compute only if object attribute doesn't exist}

COF$(o_i)$=AAB$(o_i)$*Rt

Int Exp$(o_i)$=ALB$(o_i)$*rate liability$(o_i)$

{Compute only if object attribute doesn't exist}

VOF$(o_i)$=ALB$(o_i)$*Rt

NI Calculation Rule Type II (81)

Let
$AB_{(c,t)}(o_i)$=Average Balances of the object $o_i$
$rate_{(c,t)}(o_i)$=Effective interest rate for the corresponding balance asset or liability
$Rt(o)$=Object o's product type/group as needed to identify treatment rate
$R_{(c,t)}(pt(o))$=Rate (treatment rate) for objects of this product type/group, given the balance class, and tier
Int Inc$(o_i)$=Interest Income of object $o_i$
COF $(o_i)$=Cost of funds used by object $o_i$
Int Exp$(o_i)$=Interest Expense for object $o_i$
VOF $(o_i)$=Value of funds provided by object $o_i$
Then, where summations are over the possible balance variables (class, tier) for the object, $$Int\ Inc(o_i) = \sum_{\forall c,t} AB_{(asset\,c,t)}(o_i) * rate_{(asset\,c,t)}(o_i)$$

{calculate only if object attribute doesn't exist}

$$COF(o_i) = \sum_{\forall c,t} AB_{(asset\,c,t)}(o_i) * R_{(asset\,c,t)} R_{(c,t)}(pt(o))$$

-continued $$Int\ Exp(o_i) = \sum_{\forall c,t} AB_{(liability\ c,t)}(o_i) * rate_{(liability\ c,t)}(o_i)$$

{calculate only if object attribute doesn't exist}

$$VOF(o_i) = \sum_{\forall c,t} AB_{(liability\ c,,t)}(o_i) * R_{(liability\ c,t)}R_{(c,t)}(pt(o))$$

Allocated Balances
Let
Total Amount=Balance Sheet amount to be allocated to object
Rule=Rule for allocating Amount Then, DPM calculates the allocation to object o to determine the allocated balance:

$$B(o_i) = \text{Rule applied to (Total Amount)}$$
$$= \text{The Allocated Balance}$$

Treat this balance as any one of the average balances associated with the object, where class is specified by users, tier is "allocated". Thus, $B_i(o_i)$ is one of the $AB_{(c,t)}(o_i)$ defined above.

NI Calculation Rule Type III (82)
Let
$AB_{(c,t)}(o_i)$=Average Balances of the object $o_i$
$rate_{(c,t)}(o_i)$=Effective interest rate for the corresponding balance
$Type_{p,a}(o_i)$=Object $o_i$'s product and object attributes as needed to identify treatment
$R_{(c,t)}(type_{p,a}(o_i))$=Rate (treatment rate) for this object's product type, given the balance class, and tier/tenor
Int Inc($o_i$)=Interest Income of object $o_i$
COF($o_i$)=Cost of funds used by object $o_i$
Int Exp($o_i$)=Interest Expense for object $o_i$
VOF ($o_i$)=Value of funds provided by object $o_i$
Then, where summations are over the possible balance attributes (state, tier) for the object, $$Int\ Inc(o_i) = \sum_{\forall c,t} AB_{(asset\ c,t)}(o_i) * rate_{(asset\ c,t)}(o_i)$$

{calculate only if object attribute doesn't exist}

$$COF(o_i) = \sum_{\forall c,t} AB_{(asset\ c,t)}(o_i) * R_{(asset\ c,t)}(type_{p,a}(o_i))$$

$$Int\ Exp(o_i) = \sum_{\forall c,t} AB_{(liability\ c,t)}(o_i) * rate_{(liability\ c,t)}(o_i)$$

{calculate only if object attribute doesn't exist}

$$VOF(o_i) = \sum_{\forall c,t} AB_{(liability\ c,t)}(o_i) * R_{(c,t)}(type_{p,a}(o_i))$$

NI Calculation Rule Type IV (83)
Let
$AB_{(c,t)}(o_i)$=Average Balances of the object
$rate_{(c,t)}(o_i)$=Effective interest rate for the corresponding balance amounts
$type_{p,a,b}(o_i)$=Object $o_i$'s product, object attribute, and behavior types as needed to identify treatment rate
$R_{(c,t)}(type_{p,a,b}(o_i))$=Rate (treatment rate) for objects of this product type, balance class, and tier/tenor
Int Inc($o_i$)=Interest Income of object $o_i$
COF ($o_i$)=Cost of funds used by object $o_i$
Int Exp($o_i$)=Interest Expense for object $o_i$
VOF($o_i$)=Value of funds provided by object $o_i$
Then, where summations are over the possible balance variables (state, tier) for the object, $$Int\ Inc(o_i) = \Sigma AB_{(asset\ c,t)}(o_i) * rate_{(asset\ c,t)}(o_i)$$

{calculate only if object attribute doesn't exist}

$$COF(o_i) = \Sigma AB_{(asset\ c,t)}(o_i) * R_{(asset,t)}(type_{p,a,b}(o_i))$$

$$Int\ Exp(o_i) = \Sigma AB_{(liability,t)}(o_i) * rate_{(liability,t)}(o_i)$$

{calculate only if object attribute doesn't exist}

$$VOF(o_i) = \Sigma AB_{(liability,t)}(o_i) * R_{(liability,t)}(type_{p,a,b}(o_i))$$

NI Calculation Rule Type V (84)

Any Net Interest calculation that is non-iterative, canonical, and represents the marginal GAAP valuation of an object's balance sheet resource related revenues or expenses for each ($o_i$).

Note that in firms that are highly leveraged, the use of COF/VOF separation leads to a significant and volatile piece of NI, the net difference between to sum of COF and the sum of VOF (after adjusting for EOAE per the following section) and the firm's total NI. This is known by a banker as "mismatch profits arising from the difference in tenors" (duration) of the assets and liabilities. If VOF and COF rates are based on matched maturity of objects then the difference between the firms total NI and the sum of the objects is the profit arising from the firm having different duration of balance sheet related objects. Since this profit is not related to a specific object, but the combination of objects in the enterprise, a separate profit measure is appropriate and possible using DPM's approach. The use of the rules above allow for a novel method of calculating funds transfer pricing, since the rules are based on sets, the processing can be preformed in parallel. Further, since the rules are canonical this approach leads to a computationally efficient method of calculating these types of profit values.

NI Calculations OF EOAE

Since GAAP financial statement's balance sheet is based on the balancing equation Assets equals Liabilities plus Equity, NI should be adjusted for the value of the Equity resource consumed by each Asset or Liability object. Calculating Earnings on Allocated Equity as part of an object's NI:

Four exclusive options are provided for allocating equity to objects. DPM's options are as follows:
Option 1 No calculation of EOAE.
Option 2 EOAE calculation based on a simple equity ratio.
Option 3 Equity allocation for all assets following industry standards.
Option 4 Equity allocation using an economic allocation rule, based on object cohorts and modern portfolio theory's capital asset pricing model.

Option 1 (85)

$$EOAE(o_i)=0$$

Option 2 (86)
Let
AB$_{(asset,t)}$(o$_i$)=Average Asset balances of the object o$_i$, including any allocated asset balances
ER=Equity Ratio
R$_{equity}$=Treatment Rate for equity Then, EOAE(o$_i$)=R$_{equity}$*ER*ΣAB$_{(asset,t)}$(o$_i$)

where the summation is taken over all asset balances.

Option 3 (87)
Let
Amount(o$_i$)=Amount(s) associated with object 'a' This may be the average asset balances of the object 'o$_i$' including any allocated asset balances, or may be an object parameter, etc.
Wt(type(o$_i$))=Code needed to identify the weight for object o balances, at the object-type level
W(Wt(type(o$_i$)))=determined by the weight code
Cap Ratio=An appropriate risk-weighted capital ratio chosen
R$_{equity}$=Treatment Rate for equity Then, EOAE(o$_i$)=R$_{equity}$*Σ[Amount(o$_i$)*W(Wt(o$_i$))*Cap Ratio]

where the summation is taken over all balances of o$_i$ if there are multiple amounts.

Option 4 (88)
Let
Amount(o$_i$)=An amount or amounts related to the object, such as average balances of the object (denoted AB$_{(c,s,t)}$(o$_i$)
Cohort(o$_i$)=The cohort of objects in which object o is a member
E$_{cohort}$(o$_i$)=The equity allocation rule for the cohort of object o.

This is a linear (two-valued) function that operates on Amount(o$_i$) of the form α+β*Amount(o).
R$_{equity}$=Treatment Rate(s) for equity for the Amount(o$_i$) value(s)

Then, $$EOAE(o_i) = \sum R_{equity} * E_{cohort}(o)(Amount(o_i))$$
$$= \sum R_{equity} * [\alpha + \beta * Amount(o_i)]$$

where summation occurs if Amount(o$_i$) is a set of values (such as the object and allocated balances related to the object).

4. Calculate Other Revenue for All Objects (see FIG. 9)

OR Calculation Rule Type I (90)

Let
OR$_i$=Financial Statement Other Revenue attribute subset,
OR$_i$(o$_i$)=The amount of OR$_i$ apportioned to object o$_i$,
O(OR$_i$)=the objects that map to OR$_i$.

Let M be an OR calculation method, where M is dependent upon the OR subset under consideration. We then have the following.

If M(OR$_i$)=a "balance" attribute method.

Define
M(OR$_i$)(o$_i$)=An average balance method for calculating o$_i$'s OR and $$OR_i(o_i) = OR_i * \frac{Balance(o_i)}{\sum_j (Balance(o_j))}$$

where the summation is over all o$_i$ in o$_i$(OR$_i$).

If M(OR$_i$)=A "count" method for calculating o$_i$'s OR
Define

M(OR$_i$)(o$_i$)=1 and $$OR_i(o_i) = OR_i * \frac{1}{(count(a_j) \text{ in } O(OR_i))}$$

where the count is over all o$_i$ in o$_i$(OR$_i$).

If M(OR$_i$)="event count," we can define
M(OR$_i$)(o$_i$)=Count of events in profit measurement period for object o$_i$ and $$OR_i(o_i) = OR_i * \frac{\text{count of events for object } o_i}{\sum_j (\text{count of events for object } (o_j))}$$

where the summation is over all o$_i$ in o$_i$(OR$_i$).

If M(OR$_i$)="event amount"

$$\text{Define } M(OR_i)(o_i) = \sum_{\text{events over the period}} (\text{event amounts for } o_i)$$

and $$OR_i(o_i) = OR_i * \frac{\sum_{\text{events over the period}} (\text{event amounts for object } o_i)}{\sum_j \sum_{\text{events over the period}} (\text{event amounts for object } o_i)}$$

where the summation is over all events in o$_i$(OR$_i$), and the events are restricted to a class of event type. Then, we have the total OR for object o given by the sum of these allocations for all sets for which a has an association:

OR(o$_i$)=Σ(OR$_i$(o$_i$)), summing over i.

As a generalization, these formulas can be written in shorthand where M(OR) is the corresponding function of 'o' above, as:

$$OR_i(o_i) = OR_i * \frac{M(OR_i)(o_i)}{\sum_{j}^{a_j \in A(OR_i)} M(OR_i)(o_i)},$$

and $$OR(o_i) = \sum_{i}^{o_i \in O(OR_i)} \left[ OR_i * \frac{M(OR_i)(o_i)}{\sum_{j}^{a_j \in A(OR_i)} M(OR_i)(o_i)} \right]$$

OR Calculation Rule Type II (91)

The formula for OR calculation is given as follows:

Let $o_i$=Object being considered $OR_i(o_i)$=OR apportioned to a (if any) from a set $OR_i$ $Event(t)_i(o_i)$=The event reflecting the activity of object $o_i$ in the period restricted to a given event type t.

$Amount(_{Event}(o_i))$=An event amount $Rev(Evt_i(o_i))$=The revenue amount associated with this event. This is assumed to be of the form $$= \sum_{type\,t} \sum_i [x_i * Count(Event(t)_i(o)) + \beta_i * Amt(Event(t)_i(o))]$$

where $\alpha$, $\beta$ are pre-entered values.

$OR(o_i)$=Total OR apportioned to object $o_i$

Then $$OR(o_i) = \sum_{type\,t} \sum_i (Rev(Event(t)_i(a)))$$

summed over all the events of $o_i$

+apportioned revenue as in the Type I case.

$$= \sum_{type\,t} \sum_i \left[ \begin{array}{c} x_i * Count(Event(t)_i(a)) + \\ \beta_i * Amt(Event(t)_i(a)) \end{array} \right] + \sum_i (OR_i(o_i))$$

OR Calculation Rule Type III (92)

Let $o_i$=Object being considered $OR_i(o_i)$=OR apportioned to the object (if any) from a set $OR_i$ $Event(t)_i(o_i)$=The events reflecting the activity of object o in the period restricted to a given event type t $Amount(Event_i(o_i))$=The event amount $Rev(Event_i(o_i))$=The revenue amount associated with this event.

This is assumed to be of the form $$= \sum_{type\,t} \sum_i [x_i * Count(Event(t)_i(o)) + \beta_i * Amt(Event(t)_i(o))]$$

where $\alpha$, $\beta$ are pre-entered values based on event type. For completeness, $\alpha=\beta=0$ in the event amount is null.

AM=The method of amortization=cash, SL, DB, interest $AM_k\{amount\}$=Deferral on amount, using method AM, at time k (=0 if k>life and life=1 if cash basis is selected.)

$AM_{now}\{amount\}$=Deferral on amount, using method M, at this period note that this is at various points of life for various amounts.

Let $OR(o_i)$=Total OR apportioned to object $o_i$.

Then $$OR(o_i) = \text{Amortized amounts in their first amortization period} +$$
$$\text{amortized amounts in their higher amortization periods} +$$
$$\text{amounts not amortized but apportioned from a}$$
$$\text{pool as in Type 1}$$

We take this step at a time. First, consider the amounts in their first amortization period. These are calculated as follows, using the formula generated in Type II:

Then $$OR(o_i) = \sum_{type\,t} \sum_i (Rev(Event(t)_i(o_i)))$$

summed over all the transactions of object i

+apportioned revenue as in the Type I case.

$$= \sum_{type\,t} \sum_i \left[ \begin{array}{c} x_i * Count(Event(t)_i(o_i)) + \\ \beta_i * Amt(Event(t)_i(o_i)) \end{array} \right] + \sum_i (OR_i(o_i))$$

where the $AM_1$ methods vary with the event types. We can group the amounts being amortized by their amortization characteristics. For this purpose, let $Pool_1(L,M)$=the pools of amounts amortizing in this period for the first time according to life L and amortization method M. The new amortizing amounts can be rewritten as follows:

$$\text{New amortized amounts} = \sum_{L,M} Pool_1(L, M)$$

Similarly, define $Pool_k(L,M)$=the pools of amounts amortizing in this period for the $k^{th}$ time according to life L and amortization method M, where L≦k. N.B. any amortization calculation can be used if the calculation can be derived using known Object Attributes.

Then, the total OR for object $o_i$ in this period is computed as follows:

$$OR(o_i) = \sum_{type\,t}\sum_{i}\left[\begin{array}{l}x_i * \text{Count}(\text{Event}(t)_i(o_i)) + \\ \beta_i * \text{Amt}(\text{Event}(t)_i(o_i))\end{array}\right] +$$

$$\sum_{k>1}\sum_{L,M}Pool_k(L,M) + \sum_{i}(OR_i(o_i))$$

$$= \sum_{k}\sum_{L,M}Pool_k(L,M) + \sum_{i}(OR_i(o_i))$$

OR Calculation Rule Type IVI (93)

Foregone OR:

Let Actual OR for object $o_i$=$OR_{actual}(o_i)$–CASH AMOUNTS

Let Expected OR for object $o_i$=$OR_{expected}(o_i)$

Then, $$\text{Foregone } OR \text{ for object } o_i = OR_{foregone}(o_i)$$
$$= OR_{expected}(o_i) - OR_{actual}(o_i) -$$
$$\text{CASH AMOUNTS}$$

OR Calculation Rule Type V (94)

Any Other Revenue calculation that is non-iterative, canonical, and represents the entire GGAP valuation of non-balance sheet resource related revenues or expenses.

5. Calculate Direct Expense for All Objects (See FIG. 10)

DE Calculation Rule Type I (100)

None directly specified—use IE calculation rules (any type). For each IE rule used in this way, substitute $DE(o_i)$ for $IE(o_i)$ in any IE calculations used as DE.

DE Calculation Rule Type II (101)

Direct expense will be a variable dependent upon the object and the event being costed. These determine the unit cost to be used and the calculation type, along with the multiplier rule being used if external amounts are needed. Thus, using subscripts to indicate variables used, $$DE_{object,event\text{-}type} =$$
unit $cost_{event\,type}$ * (no. of events of this type in the period) + amounts taken from an event file + costs calculated as a percentage of Event Amount,

Where the unit costs, and revenue percentage by event type, are all entered by the user as pre-processing inputs.

Then, $$DE_{object} = \sum_{event\,types} DE_{object,event\text{-}type}$$

where the summation is over event types.

DE Calculation Rule Type III (102)

$$DE_{object,event\text{-}type,event\text{-}sub} =$$
unit $cost_{event\,type}$ * (no. of events of this type in the period) + amounts taken from an event file + costs calculated as a percentage of event amount

DE Calculation Rule Type IV (103)

Two calculations are made, each one using the above calculations, processing two independent DE attributes for each object. DE is calculated twice for each object, allowing for comparison of plan to actual values or standard to actual values or any scenario to scenario comparison.

DE Calculation Rule Type V (104)

Any Direct Expense calculation that is non-iterative, canonical, and represents the entire GGAP valuation of costs related to object or sub-object level details.

6. Calculate Provision for All Objects (See FIG. 11)

P Calculation Rule Type I (110)

The formula for calculating P of Object i is as follows, where $PG(o_i)$ denotes the P group in which $o_i$ is a member:

$$P(o_i) = PG(o_i) * \frac{\text{Balance of } o_i}{\sum_{k}^{o_k \in RPG(o_i)} \text{Balance } o_k}.$$

P Calculation Rule Type II (111)

The formula for calculating P of $o_i$ is as follows, using the same symbols as above and $RF(o_i)$ denotes the expected adjustment factor for $o_i$:

$$P(o_i) = PG(o_i) * \frac{\text{Balance}(o_i) * RF(o_i)}{\sum_{k}^{o_k \in RPG(o_i)} [\text{Balance}(o_k) * RF(o_k)]}.$$

P Calculation Rule Type III (112)

The formula for calculating P of object "$o_i$" is as follows, where $Pr(o_i)$ is a probability for object $o_i$.

$$P(o_i) = \text{Exposure}(o_i) * Pr(o_i) * \text{Expected Value Adjustment}(o_i) * \frac{1}{L_i}$$

Where L is the expected number of reporting periods during the life of $o_i$.

P Calculation Rule Type IV (113)

The addition of any of the Type I, II or III P rules applicable to an object i.

$$P(o_i) = P(o_i)_{P\,Type\,I} + P(o_i)_{P\,Type\,II} + P(o_i)_{P\,Type\,III} + P(o_i)_{P\,Type\,IV}$$

P Calculation Rule Type V (114)

Any Provision calculation that is non-iterative, canonical, and represents the entire GGAP valuation of expected costs related to future events, contingencies, timing effects.

7. Calculate Indirect Expense for All Objects (See FIG. 12)

Indirect expense, by its nature is not related directly to an Object, therefore apportionment techniques are used to allocate indirect expense to an Object. Any apportionment function is allowed as long as it is derivable at the object level using ratios of attributes available at the object level to the summation of this available attribute across all objects receiving the apportioned expense. Examples of this type of ratio calculation (the function "F" used in the IE calculation types) are:

Ratio 1: Balance-based apportionment of IE. Define Apportionment ratio using Current Balance of ($o_i$).

Thus, the allocation of Indirect Expense k becomes (function $F(IE_k)(o_i)$ in IE rules below):

$$IE_k * \frac{\text{Current Balance of } o_i}{\sum_j (\text{Current Balance of } o_j)},$$

summed over all objects in grouping j.

Ratio 2: Count-based apportionment of IE

Thus, the allocation of Indirect Expense k becomes (function $F(IE_k)(o_i)$ in IE rules below):

$$IE_k * \frac{1}{(\text{count of } o_j \text{ in } O(IE_k))},$$

for all objects in grouping j.

Ratio 3: Revenue-based apportionment of IE Define $NI(o_i)+OR(o_i)=$Total Revenue (using NI & OR rules above) for ($o_i$).

Thus, the allocation of Indirect Expense k becomes (function $F(IE_k)(o_i)$ in IE rules below):

$$IE_k * \frac{NIR(o_i) + OR(o_i)}{\sum_j (NIR(o_j) + OR(o_j))},$$

summed over all objects in grouping j

Ratio 4: Event Count apportionment of IE Count of events for ($o_i$) are restricted to an event type.

Thus, the allocation of Indirect Expense k becomes (function $F(IE_k)(o_i)$ in IE rules below):

$$IE_k * \frac{\text{count of event for object } o_i}{\sum_j (\text{count of event for object}(o_j))}$$

for some event type, summed over all objects in grouping j.

Ratio 5: Transaction Amount apportionment of IE Summation of event amounts for ($o_i$), restricted to a event type.

Thus, the allocation of Indirect Expense k becomes (function $F(IE_k)(o_i)$ in IE rules below):

$$IE_k * \frac{\sum_{\text{event over the period}} (\text{event amounts for object}(o_i))}{\sum_j \sum_{\text{event over the period}} (\text{event amounts for object}(o_j))},$$

for some event type, summed over all objects in grouping j.

Ratio 6: Direct Expense apportionment of IE Using DE rules above for $O_i$.

Thus, the allocation of Indirect Expense k becomes (function $F(IE_k)(o_i)$ in IE rules below):

$$IE_k * \frac{DE(o_i)}{\sum_j (DE(o_j))},$$

summed over all objects in grouping j.

Ratio 7: Normalized (averaged) apportionment of IE

Thus, the allocation of Indirect Expense k becomes in IE rules below:

$$F(IE_k)(o_i) = \begin{bmatrix} IE \text{ using Ratio 1 } F(IE_k)(o_i) + \\ IE \text{ using Ratio 3 } F(IE_k)(o_i) + \\ IE \text{ using Ratio 6 } F(IE_k)(o_i) \end{bmatrix} \div 3.$$

IE Calculation Rule Type I (120)

Indirect expense is apportioned to accounts using one of the first three apportionment ratios above. Accordingly, using the nomenclatures above, $$IE(o_i) = (\text{Total } IE \text{ to be apportioned}) * \frac{F(IE_k)(o_i)}{\sum_k F(IE_k)(o_i)}$$

IE Calculation Rule Type II (121)

The rules for partitioning IE and defining corresponding object groups are based on product and event attributes. The calculation of $IE(o_i)$ is exactly as described above, and is given by the following, where the F's are the given apportionment ratios (any of the seven apportionment ratios are permitted for any partition O or groupings of objects).

$$IE(o_i) = \sum_k^{o_i \in O(IE)} \left( IE_k * \frac{F(IE_k)(o_i)}{\sum_j^{o_i \in O(IE)} F(IE_k)(o_j)} \right)$$

IE Calculation Rule Type III (122)

For Indirect Expense before deferral calculations, the process is similar to that as listed for the Type II Level, where:

$IE(o_i) = $ New amounts in their first period of amortization +

Amounts not being amortized (cash basis) +

Amounts in their $2^{nd}$ through last amortization period.

Since we include non-amortized amounts (cash basis) to be considered as amortized with only one period, this is rewritten as follows:

$IE(o_i) = $ New amounts in their first period of amortization (including cash-basis) +

Amounts in their $2^{nd}$ through last amortization period.

Note that non-amortized amounts are made to fit this equation by considering them to be an amortization of one profit reporting period only. Each IE set can have a different amortization type or period, though all objects receiving a specific apportionment will share the same amortization Rule. The new amounts to be deferred are computed, therefore, as the following:

Before deferral $$IE(o_i) = IE_k * \frac{F(IE_k)(o_i)}{\sum_{j}^{o_i \in O(IE)} F(IE_k)(o_j)}$$

added over each set $IE_k$ to which $o_i$ is related.

$$= \sum_{k}^{o_i \in O(IE)} \left( IE_k * \frac{F(IE_k)(o_i)}{\sum_{j}^{o_i \in O(IE)} F(IE_k)(o_j)} \right)$$

Each of these terms may be deferred over its amortization period according to any of the amortization rules (cash, straight line, declining balance, or interest amortization calculations). Since amortization methods may vary by set, we have the following, where $AM_1(L,R)$ is used to denote the amortization rule and its life:

$$IE(o_i) = \sum_{k}^{o_i \in O(IE)} AM_1(L, R) \left( IE_k * \frac{F(IE_k)(o_i)}{\sum_{j}^{o_i \in O(IE)} F(IE_k)(o_j)} \right)$$

To this is added the amounts with remaining amortization life for which amortization was begun in earlier periods.

IE Calculation Rule Type IV (123)

Multiple combinations of the any of the above IE type rules I, II, or III are calculated per object.

IE Calculation Rule Type V (124)

Any Indirect Expense apportionment calculation that is non-iterative, canonical, and represents the GAAP evaluation of indirect costs.

8. Calculate After-Tax Object Profit for All Objects (See FIG. 13)

Profit($o_i$)=[NIR($o_i$)+OR($o_i$)−DE($o_i$)−IE($o_i$)−P($o_i$)]* (1−EffectiveTaxRate)

where, for a two tier taxation system, Effective Tax Rate is calculated as:

Effective Tax Rate=(1−tax rate 2)*(tax rate 1)+tax rate 2.

In the calculation of Effective Tax Rate, this formula assumes the two rates are effective rates which apply to the business conditions (not the nominal statutory rates), and that tax rate can be deducted from income in the calculation of tax rate.

Then, $$\text{Total Profit} = \sum_{i} [\text{Profit}(o_i)]$$

For those companies which use economic profit value calculations, the formula changes to:

Profit($o_i$)={[NIR($o_i$)+OR($o_i$)−DE($o_i$)−IE($o_i$)−P($o_i$)]* (1−EffectiveTaxRate)}−SVA($o_i$)

where

SVA($o_i$)=α($o_i$)+β($o_i$)*Amount($o_i$)

and

α($o_i$), β($o_i$) are functions for a cohort of objects in which $o_i$ is a member, and Amount($o_i$) is given by a rule which maps $o_i$ to a data value (such as balance, or allocated equity) also defined at the cohort level. (A cohort defined here represents a grouping of objects with similar risk characteristics, consistent with Modern Portfolio Theory and the Capital Asset Pricing Model.)

Shareholder Value Add (SVA) is a method financial analysts use to adjust profit measures for risk. The idea is to subtract from the profit measure the cost of the equity required to support whatever object is being measured. Companies use this risk adjustment measure essentially to burden the profit for risk being taken with the equity funds used by the object. These institutions will classify cohorts of risk and the risk cost equivalent as a percentage of account balance or allocated equity (i.e., "Hurdles").

DPM Example

In the airline industry a need for detailed customer profitability can be measured using DPM. Here the fundamental object is the seat, allowing consistent profitability values aggregated by route, aircraft type, as well as customer dimensions using data warehousing technology. The need for detailed customer profitability is being driven by the business impact analysis required to support loyalty and alliance strategic decisions. The following is a DPM profit calculation for a seat, with real profit measurement parameters simplified (not all aspects of true airline business is demonstrated) and where examples of each type of rule are utilized in DPM processing.

Flight: Air101

Date: Jul. 1, 1998

From: London

To: New York

Equipment: Boeing 747400

Classes: First (20 Seats); Business (80 Seats); Economy (300 seats)

Detailed Profit Metric Processing

Step 1: Populate Database—assuming a relational database management system and terminology.
  Initialize database;
    Extract, Condition, and Load the following tables: Planes, Flights, Customers, Employees, Locations; The net balances in the Planes entity can be maintained by use of DPM amortization IE calculation from the prior period.

Extract, Condition, and Load the following tables: Financial Transactions, Events; Manifest (occupant, seat, flight, date attributes);

Extract, Condition, and Load the Financial Statement table;

Calculate and populate Rate table;

FIG. 14 shows a partial relational database schema showing the entities and attributes used in the example's processing.

Step 2: Maintain Object Groups and Rule Maps—a database processing routine is performed creating the following groupings:

Class to Seat
  Flight to Locations
  Seat to Plane

For ease in understanding the rule the specifications used to populate the database with rule parameters the processing instructions are shown below in the Rules. Also, most rules group by plane—the rule discussion below assumes this grouping without reference.

Step 3: Calculate Net Interest for Seat—Four types of NIR rules are processed—type I, II, III, IV for each seat. Interest rates are matched to plane purchase date for initial plane investments, and interest rates for plane net capitalizable improvements are funded with a 5 year pool of rates. Plane asset balances are kept in the Plane table maintained in Step 1.2 above.

NIR Type I: Carry cost of plane asset by seat is determined.

Rule
  Populated in Step 2 are:
    The AAB(seat) parameter is Plane: net_orig_bal*(1/total seats on plane)
    The rt parameter is Treatment_rts: 25_yr_rate (maintained for each plane) There is no need for liability rates.

Calculate COF(seat)=AAB(seat)*rt for all seats on flight.

All other attributes are NI Type I calculations results are null. No grouping.

NIR Type II: Allocate net receivable/payable to seat for carry cost profit adjustment. This adjusts profitability for the impact of cash flows vs. accounting flows. This airline wants to apportion this cost across all revenue seats based on class_wt, a modeling parameter. A total weighted seat (tws) for the accounting period is a modeling parameter; where the seat factor is determined as a ratio of seat footprint to class portion of the plane's seat revenue space. (e.g. $1^{st}$=15%, $2^{nd}$=25% & $3^{rd}$=60% of plane's seat revenue space with each seat evenly apportioned in class—1/20, 1/80, 1/300 respectively, in this case.)

Rule
  Populated in Step 2 are:
    The AB(seat) parameter is Financial: net_recv'ble*(1/tws)
    The rt parameter is Treatment_rts: pool (for null plane row)
  There is no need for liability rates.

Calculate COF(seat)=AB(seat)*rt*class_wt

Grouped by class all seats, so no_seats??? is no_seats1st value in the plane entity for first class seats on this plane, and so on for $2^{nd}$ & $3^{rd}$ class seat groups. The net recv'ble column is derived from the difference between sums of period_amts for the receivables minus sum of payable rows for this profit period.

All other attributes and NI Type II calculations results are null.

NIR Type III: Calculate the NI value of the customer mileage benefit payable for each seat.

Rule
  Populated in Step 2 are:
    The AB(seat) parameter is Customer: bene_miles*loyalty factor
    The rt parameter is Treatment_rts: pool (for null plane row)
  There is no need for an asset rate.

Calculate COF(seat)=AB(seat)*rt

Since a customer can only occupy one seat, no groupings are used in this rule map.
  All other attributes and NI Type III calculations results are null.

NIR Type IV: Calculate the NI impact of the plane's improvements for each seat. Upper classes interior, customer electronics and seating are improved faster during the life of the plane. Management strategy is for these improvements to be loyalty program related; they are amortized quicker and hence shorter funding requirement with less certain life. Therefore the loyal customers to pay proportionately more of the funding costs of improvement assets.

Rule
  Populated in Step 2 are:
    The AB(seat) parameter is Plane:imp_net_bal*(1/tsw)
    The rt parameter is Treatment_rts: pool (for plane row)*Customer: loyalty_rtng
  There is no need for a liability rate.

Calculate COF(seat)=AB(seat)*rt*class_fac

The unique class_fac values sum to 1. The rule map is grouped by classes (or class_fac).
  All other attributes and NI Type IV calculations results are null.

NI EOAE—Option 4: Allocate equity based on mileage benefit and have it reduce NI by the weighted average cost of capital for the airline.

Rule
  Populated in Step 2 are:
    The Amount(seat) parameter is Customer:bene_miles
    The equity rate is 9.75%

Calculate EOAE(seat)=Amount(seat)*equity rate*cohort_wt

The cohort is based groups of each instance of loyalty_rtng and class of seat paired. Cohort_wt is "beta" and no "alpha."
  All other attributes and EOAE calculations results are null.

Step 4: Calculate Other Revenues for each Seat—Revenue arises from ticket fares, duty free sales on board aircraft, excess baggage penalties collected, alliance code sharing license and multiple leg customer trips.

OR Type I: Apportion revenue from code sharing with alliance. Apportion revenue by seat allocated to alliance passenger.

Rule
  Populated in Step 2 are:
    Flight:period_amt is alliance revenue per flight plus the sum of all flight/date alliance financial transactions.

Calculate OR(seat)=sum of Flight:period_amt*(1/no alliance seats available on flight)

Only for seats occupied by an alliance customer or a seat that is empty.
  OR Type II: Use Transaction table to find direct passenger revenue by seat.
Rule
  Populated in Step 2 are:
    Transaction:* (amounts, seats, flight, date, transaction type) are populated for events, financial or non-financial.

Calculate OR(seat)=sum of Transaction:trn_amt where type="passenger_payment" for each seat.
  No seat grouping in rule map.
  OR Type III: Apportion flight freight revenue amongst all seats, weighted by class_wt.
Rule Calculate OR(seat)=sum of Transaction: trn_amt*class_wt*(1/(no_seats???))

where type "freight" for each seat.
  Group seats by class (??? Is $1^{st}$, $2^{nd}$, $3^{rd}$) Class_wt is a normalized weight for apportioning revenue amongst classes.
  OR Type IV: Calculate the loyalty mileage benefit by seat.
  Rule Calculate Forgone OR(seat)=Flight: ???_fare−sum of transactions:trn_amt where type="passenger-payment" for each seat.

Group by class for loyalty passenger occupied seats only.

Step 5: Calculate Direct Expenses for each Seat—Compute the direct cost of using the seat. This is true for both occupied and unoccupied seats. Fuel and flight deck crew are costs of all seats, while cost of duty free goods sold and meals are a function of occupied seats. Some costs are a function of the plane taking off, no matter the duration of the flight (e.g., maintenance.) Some costs are a function of class, such as cabin crew expense and customer consumables.
  DE Type I: Show direct cost of non-food materials consumed in flight.
Rule
  Populated in Step 2 are:
    Transactions:* is populated based on these direct costs.
    Calculate DE(seat)=Transactions:trn_amt for all flight and date rows where type=direct_exp for each seat.
    No grouping in rule map.
      DE Type II: Show direct cost duty free goods sold by seat.
Rule
  Populated in Step 2 are:
    Transactions:* are populated based on these direct costs.
    Calculate DE(seat)=Transactions:trn_amt for all flight and date rows where type=duty_free for each seat.
    No grouping in rule map.
      DE Type III: Show direct cost of food and beverage consumed.

Rule
  Populated in Step 2 are:
    Transactions:* are populated based on these direct costs
    Loading is calculated as the ratio of occupied to total class seats by class (cl_load) using manifest table and plane configuration values.
  Calculate DE(seat)=Flight: catering_cost*class_wt*cl_load for each seat.
  Grouped by class in rule map.
  DE Type IV: The staffing of each cabin has a maximum count with a minimum of 1 per 50 passengers. The air deck crew must fly the plane even if there are no passengers. Calculate DE twice, once for based on a labor cost per seat based on total crew cost and total seats; and calculate DE a second time with actual staff apportioned to actual passengers.
Rule
  Populated in Step 2 are:
    Total crew cost (tcc1) parameter is derived using the employee entity for all crew on flight. Tcc=Employee:salary+bene*(Flight:schd_hours+1.5)/110
    Total crew cost (tcc2) parameter is derived using the employee entity for all crew on flight by class. Tcc???=Employee:salary+bene*(Flight:schd_hours+1.5)/110 Note: tcc=tcc1st+tcc2nd+tcc3rd Calculate DE1(seat)=tcc*(1/(total no. of seats on plane))

Calculate DE2(seat)=tcc??*(1/(no. of seats occupied in class)) for each seat.

Grouped by class in rule map.

Step 6: Calculate Provisions for each Seat—The cost of expected future events are measured here. The airline self insures property, casualty and miscellaneous insurance premiums on a per flight basis. And a provision for future loyalty benefit, a function of loyalty rating, claimed is made in step 6.
  P Type I: —The cost of the flight's insurance premium is apportioned to each seat.
Rule
  Populated in Step 2 are:
    Insurance premium is maintained in the flight entity (total PG)

Calculate P(seat)=Flight:ins_prem*1/(total no. seats on plane)

No grouping in rule map.
    P Type II: Provision for unusual maintenance cost is made on a function of the inverse of flight time and takeoffs in the last 12 months.
Rule
  Populated in Step 2 are:
    Financial:period_amt is maintained in the financial entity by equipment type.
    Total flight hours and last 12 months take-offs are accumulated each month, their product is to_hrs parameter.

Calculate P(seat)=Financial:period_amt*1/(total no. of seats on plane)*(Plane:to_last12*Flight:schd_hrs)/to_hrs No seat grouping in rule map.
      P Type III: Providing for future loyalty benefit.
Rule
  Populated in Step 2 are:
    Customer:bene_miles is maintained using prior periods provision for benefit miles by loyalty customer A parameter estimating the usage rate by loyalty cohart called burn factor Calculate P(seat)=Flight:distance*burn (loyalty_rating)

Grouping by loyalty rating in rule map.
P Type IV: Future order cancellation reserve.

Rule
Populated in Step 2 are:
Future airplane order cancellation penalty (pen) and order size (fut_planes) is maintained in the financial entity
Last 12 months loading is calculated by plane Calculate P(seat)=pen*(Plane:orig_bal/fut_planes)*1/(total no. seats on plane)*1/24.where last 12 months loading less than 75%.

Only seats on where last 12 months loading less than 75%.

Step 7: Calculate Indirect Expenses for each Seat—The calculation of indirect expense is the final step of detailed level profit calculation. Here remaining cost measures that are not differentiable by seat are measured. Fuel and oil, ground costs, regular aircraft maintenance, overheads, and general marketing expenses are apportioned in IE. The airline also wants to view customer profitability loaded with the cost of unoccupied seats.
IE Type I: General and administrative costs are apportioned to a seat in this rule.

Rule
Populated in Step 2 are:
The periods financial entity is populated with all of the airlines G&A expenses (e.g., type of G&A are passenger services, navigation licenses, rentals, miscellaneous costs, premises and property taxes.) Allocate these costs based on seat revenue (NI+OR.)

Calculate IE(seat)=sum(Financial:trn_amt)*(sum(NI(seat))+sum(OR(seat)))/(Total OR+NI for period)

No seat grouping in rule map for all Financial: type="G&A".
IE Type II: Ground location costs, airport specific and gate expenses are apportioned by flight.

Rule
Populated in Step 2 are:
Populate all of these expenses for the period Transactions: trn_amt with the type being the three letter international airport identifier.
Calculate the number of seats flown to the flight airports during the profit period (ffc)

Calculate IE(seat)=sum of Transactions:trn_amt* (1/tfc)/2

Group transactions by pair of airports in flight row for rule map, where only these types of expenses are included in the tuple.
IE Type III: Fixed asset depreciation is allocated to a seat.

Rule
Populated in Step 2 are:
The net plane balances (Plane:net_orig_bal & Plane:imp_net_bal) are updated for last period's amortization or write-off.
The amortization factor (function of amortization) given age of asset (for both original investment and improvements) is amfo and amfi for each plane.

The tax planning estimate for taxable equivalent gross-up, due to accelerated tax amortization, is 0.8=teg (less than 1 since a tax credit)

Calculate IE(seat)=((Plane:net_orig_bal−Plane:orig_bal)*amfo)+(Plane:imp_org_bal−Plane:imp_org_bal)*amfi))*teg*(1/(total no. seats on plane))* (Flight:schd_hrs/Plane:hrs_last_12/12)

No grouping of seats in rule map.
IE Type IV. Indirect marketing expenses are apportioned by loyalty class for customer profit aggregations and by seat for other aggregations.

Rule
Populated in Step 2 are:
Indirect marketing expense per loyalty tier per flight is parameterized as mef???, where ??? is $1^{st}$, $2^{nd}$, $3^{rd}$ class.

Calculate IE(seat)=mef???*(1/(no. of occupied seats in ???))

Group seats by class in rule map.
IE Type V: For loyalty investment analysis, allocate all
DE for empty seats to occupied seats equally.
Populated, after all prior steps are calculated, are the total DE less OR for each flight during the period, idef.

Calculate IE(seat)=idef/(total no. of occupied seats)

Only calculate for occupied seats.

Step 8: Calculate After-tax Seat Profit—The After-tax Profit:

Rule
Populated in Step 2 are:
The effective tax rate (etr) for the airline is maintained in the database.

Calculate Profit(seat)=sum(NI(seat)+OR(seat)+DE (seat)+IE(seat)+P(seat))*(1−etr)

Each seat is calculated individually, no grouping is used.
Shareholder Value-add: The airline has determined that some routes have a greater risk of loss due to the volatility of loading factors. Therefore each route is given a risk factor based on the last 12 months standard deviation of loading.

Rule
Populated in Step 2 are:
Flight:risk_factor is maintained here
Economic equity per average seat parameter (Flight:risk_factor) per route
Cost of capital rate is parameterized (eqrt)

Calculate SHV(seat)=Profit(seat)−(Flight: risk_factor*eqrt)

Each seat is calculated.
From the foregoing, it will be appreciated that DPM provides a metric of profit measurement consistent with GAAP at a level of detail that has not been accomplished using the traditional General Ledger based data with analytical (apportioned) and/or sample survey based information.

This new ability to resolve profit measures at a detailed level without using analytical models or statistical extrapolation is a capability needed throughout industries that find their ability to determine a marginal decision's profit impact inadequate for optimization of ownership value. The use of rule driven and database measurement processes will give large scale businesses a lower cost of maintenance and technologically scaleable tool to measure profit at a level of precision or resolution not possible in prior financial performance measurement processes.

Although a particular embodiment of the invention has been described in detail for purposes of illustration, various modifications may be made without departing from the spirit and scope of the invention. Accordingly, the invention is not to be limited, except as by the appended claims.

What is claimed is:

1. A method for transforming a computerized profit database, comprising the steps of:
    providing a computerized profit database having profit information;
    providing a relational database management system operable in association with the computerized profit database;
    preparing the profit information to be accessed electronically through the relational database management system, including the step of calculating opportunity values for funds used or supplied by each object being measured;
    establishing, in the relational database, rules for processing the prepared information, including the steps of providing information necessary to select objects and performing a profit calculus;
    using the relational database management system to independently calculate at least one marginal value of profit for each object being measured using the established rules as applied to a selected set of prepared information;
    using the relational database management system to calculate a fully absorbed profit adjustment value for each object being measured; and
    combining the at least one marginal value of profit and the fully absorbed profit adjustment value to create a measure for object level profitability.

2. The process of claim 1, wherein the relational database comprises a structured query language (SQL).

3. The process of claim 1, wherein the step of calculating at least one marginal value of profit includes the steps of calculating net interest (NI), other revenue (OR) and direct expense (DE), wherein net interest (NI) is the summation of interest income, value of funds provided and earnings on equity funds used less the sum of interest expense and costs of funds used, other revenue (OR) is a measure of profit contribution from non-interest related sources, and direct expense (DE) is the profit value reduction due to marginal resource consumption by the object.

4. The process of claim 1, wherein the step of calculating at least one marginal value of profit includes the step of provisioning (P) for the selected set of prepared information, provisioning being the expected profit value adjustment for future outcomes related to the object.

5. The process of claim 4, wherein the step of calculating a fully absorbed profit adjustment value includes the step of calculating the value for indirect expense (IE) which is an apportioned profit value adjustment for all non-object related resource consumption.

6. The process of claim 5, wherein the combining step includes the steps of adding net interest (NI) and other revenues (OR), and subtracting therefrom direct expense (DE), provisioning (P) and indirect expense (IE).

7. The process of claim 6, including the step of adjusting the measure for object level profitability for taxes and/or object economic value.

8. The process of claim 1, wherein the opportunity values are based on matched maturity funds transfer pricing theory, where the values are market alternative supplies or uses of funds having matched interest and payment characteristics.

9. The process of claim 3, wherein the Net Interest (NI) is calculated as:
    Int Inc($o_i$)=Interest Income of object $o_i$
    −COF($o_i$)=Cost of funds used by object $o_i$
    −Int Exp($o_i$)=Interest Expense for object $o_i$
    +VOF($o_i$)=Value of funds provided by object $o_i$
according to:

$$\text{Int Inc}(o_i)=\text{AAB}(o_i)^*\text{rate}_{asset}(o_i), \text{ only if object attribute doesn't exist,}$$

$$\text{COF}(o_i)=\text{AAB}(o_i)^*\text{Rt}$$

$$\text{Int Exp}(o_i)=\text{ALB}(o_i)^*\text{rate}_{liability}(o_i), \text{ only if object attribute doesn't exist, and}$$

$$\text{VOF}(o_i)=\text{ALB}(o_i)^*\text{Rt},$$

wherein:
    AAB($o_i$)=Average Asset Balance of the object $o_i$,
    ALB($o_i$)=Average Liability Balance of the object $o_i$,
    rate$_{asset}$($o_i$)=Effective interest rate for object $o_i$ as an asset balance,
    rate$_{liability}$($o_i$)=Effective interest rate for object $o_i$ as a liability balance,
and
    Rt=Treatment rate based on the identified treatment for the object's product attributes.

10. The process of claim 9, including the step of calculating earnings on allocated equity, where the summation is taken over all asset balances, according to:

$$\text{EOAE}(o_i)=R_{equity}^*\text{ER}^*\Sigma\text{AB}_{(asset,t)}(o_i), \text{ wherein:}$$

AB$_{(asset,t)}$($o_i$)=Average Asset balances of the object $o_i$, including any allocated asset balances,
ER=Equity Ratio, and
R$_{equity}$=Treatment Rate for equity.

11. The process of claim 9, including the step of calculating earnings on allocated equity according to:

$$\text{EOAE}(o_i)=R_{equity}^*\Sigma[\text{Amount}(o_i)^*W(\text{Wt}(o_i))^*\text{Cap Ratio}],$$

wherein:
    Amount($o_i$)=Amount(s) associated with object 'a' This may be the average asset balances of the object '$o_i$' including any allocated asset balances, or may be an object parameter,
    Wt(type($o_i$))=Code needed to identify the weight for object o balances, at the object-type level,
    W(Wt(type($o_i$)))=determined by the weight code,
    Cap Ratio=An appropriate risk-weighted capital ratio chosen, and
    R$_{equity}$=Treatment Rate for equity.

12. The process of claim 9, including the step of calculating earnings on allocated equity, according to:

$$\text{EOAE}(o_i)=\Sigma R_{equity}^*E_{cohort}(o)(\text{Amount}(o_i)), \text{ or}$$
$$\Sigma R_{equity}^*[\alpha+\beta^*\text{Amount}(o_i)], \text{ wherein:}$$

Amount($o_i$)=An amount or amounts related to the object, such as average balances of the object (denoted AB$_{(c,s,t)}$($o_i$),
Cohort($o_i$)=The cohort of objects in which object o is a member,
E$_{cohort}$($o_i$)=The equity allocation rule for the cohort of object o, according to a linear (two-valued) function that operates on Amount($o_i$) of the form $\alpha+\beta^*\text{Amount}(o)$, and $R_{equity}$=Treatment Rate(s) for equity for the Amount($o_i$) value(s).

13. The process of claim 3, wherein Net Interest (NI) is calculated as the summations over the possible balance variables for the object, according to:

$$Int\ inc(o_i) = \sum_{\forall c,t} AB_{(asset\ c,t)}(o_i)^* \ rate_{(asset\ c,t)}(o_i),$$

calculate only if object attribute doesn't exist, $$-COF(o_i) = \sum_{\forall c,t} AB_{(asset\ c,t)}(o_i)^* R_{(asset\ c,t)} R_{(c,t)}(pt(o))$$

$$- Int\ Exp(o_i) = \sum_{\forall c,t} AB_{(liability\ c,t)}(o_i)^* \ rate_{(liability\ c,t)}(o_i),$$

only if object attribute doesn't exist, $$+VOF(o_i) = \sum_{\forall c,t} AB_{(liability\ c,t)}(o_i)^* R_{(liability\ c,t)} R_{(c,t)}(pt(o)),$$

wherein:

$AB_{(c,t)}(o_i)$=Average Balances of the object $o_i$,
$rate_{(c,t)}(o_i)$=Effective interest rate for the corresponding balance asset or liability,
Rt(o)=Object o's product type/group as needed to identify treatment rate,
$R_{(c,t)}(pt(o))$=Rate (treatment rate) for objects of this product type/group, given the balance class, and tier,
Int Inc($o_i$)=Interest Income of object $o_i$,
COF($o_i$)=Cost of funds used by object $o_i$,
Int Exp($o_i$)=Interest Expense for object $o_i$, and
VOF($o_i$)=Value of funds provided by object $o_i$.

14. The process of claim 13, including the step of calculating earnings on allocated equity, where the summation is taken over all asset balances, according to:

EOAE($o_i$)=$R_{equity}$*ER*$\Sigma AB_{(asset,t)}(o_i)$, wherein:

$AB_{(asset,t)}(o_i)$=Average Asset balances of the object $o_i$, including any allocated asset balances,
ER=Equity Ratio, and
$R_{equity}$=Treatment Rate for equity.

15. The process of claim 13, including the step of calculating earnings on allocated equity according to:

EOAE($o_i$)=$R_{equity}$*$\Sigma$[Amount($o_i$)*W(Wt($o_i$))*Cap Ratio], wherein:
Amount($o_i$)=Amount(s) associated with object 'a' This may be the average asset balances of the object '$o_i$' including any allocated asset balances, or may be an object parameter,
Wt(type($o_i$))=Code needed to identify the weight for object o balances, at the object-type level,
W(Wt(type($o_i$)))=determined by the weight code,
Cap Ratio=An appropriate risk-weighted capital ratio chosen, and
$R_{equity}$=Treatment Rate for equity.

16. The process of claim 13, including the step of calculating earnings on allocated equity, according to:

EOAE($o_i$)=$\Sigma R_{equity}$*$E_{cohort}$(o)(Amount($o_i$)), or $\Sigma R_{equity}$*[$\alpha$+$\beta$*Amount($o_i$)], wherein:

Amount($o_i$)=An amount or amounts related to the object, such as average balances of the object (denoted $AB_{(c,s,t)}(o_i)$,
Cohort($o_i$)=The cohort of objects in which object o is a member, $E_{cohort}(o_i)$=The equity allocation rule for the cohort of object o, according to a linear (two-valued) function that operates on Amount($o_i$) of the form $\alpha+\beta$*Amount(o), and
$R_{equity}$=Treatment Rate(s) for equity for the Amount($o_i$) value(s).

17. The process of claim 3, wherein Net Interest (NI) is calculated as the summations over the possible balance attributes for the objects, according to:

$$IntInc(o_i) = \sum_{\forall c,t} AB_{(asset\ c,t)}(o_i) * rate_{(asset\ c,t)}(o_i),$$

only if object attribute doesn't exist, $$-COF(o_i) = \sum_{\forall c,t} AB_{(asset\ c,t)}(o_i) * R_{(asset\ c,t)}(type_{p,a}(o_i)),$$

$$-IntExp(o_i) = \sum_{\forall c,t} AB_{(liability\ c,t)}(o_i) * rate_{(liability\ c,t)}(o_i),$$

only if object attribute doesn't exist, $$+VOF(o_i) = \sum_{\forall c,t} AB_{(liability\ c,t)}(o_i) * R_{(c,t)}(type_{p,a}(o_i)),\ wherein:$$

$AB_{(c,t)}(o_i)$=Average Balances of the object $o_i$,
$rate_{(c,t)}(o_i)$=Effective interest rate for the corresponding balance,
Type$_{p,a}(o_i)$=Object $o_i$'s product and object attributes as needed to identify treatment,
$R_{(c,t)}(type_{p,a}(o_i))$=Rate (treatment rate) for this object's product type, given the balance class, and tier/tenor,
Int Inc($o_i$)=Interest Income of object $o_i$,
COF($o_i$)=Cost of funds used by object $o_i$,
Int Exp($o_i$)=Interest Expense for object $o_i$, and
VOF($o_i$)=Value of funds provided by object $o_i$.

18. The process of claim 17, including the step of calculating earnings on allocated equity, where the summation is taken over all asset balances, according to:

EOAE($o_i$)=$R_{equity}$*ER*$\Sigma AB_{(asset,t)}(o_i)$, wherein:

$AB_{(asset,t)}(o_i)$=Average Asset balances of the object $o_i$, including any allocated asset balances,
ER=Equity Ratio, and
$R_{equity}$=Treatment Rate for equity.

19. The process of claim 17, including the step of calculating earnings on allocated equity according to:

EOAE($o_i$)=$R_{equity}$*$\Sigma$[Amount($o_i$)*W(Wt($o_i$))*Cap Ratio], wherein:
Amount($o_i$)=Amount(s) associated with object 'a' This may be the average asset balances of the object '$o_i$' including any allocated asset balances, or may be an object parameter,
Wt(type($o_i$))=Code needed to identify the weight for object o balances, at the object-type level,
W(Wt(type($o_i$)))=determined by the weight code,
Cap Ratio=An appropriate risk-weighted capital ratio chosen, and
$R_{equity}$=Treatment Rate for equity.

20. The process of claim 17, including the step of calculating earnings on allocated equity, according to:

EOAE($o_i$)=$\Sigma R_{equity}$*$E_{cohort}$(o)(Amount($o_i$)), or $\Sigma R_{equity}$*[$\alpha$+$\beta$*Amount($o_i$)], wherein:

Amount($o_i$)=An amount or amounts related to the object, such as average balances of the object (denoted $AB_{(c,s,t)}(o_i)$, Cohort($o_i$)=The cohort of objects in which object o is a member, $E_{cohort}(o_i)$=The equity allocation rule for the cohort of object o, according to a linear (two-valued) function that operates on Amount($o_i$) of the form $\alpha+\beta$*Amount(o), and $R_{equity}$=Treatment Rate(s) for equity for the Amount($o_i$) value(s).

21. The process of claim 3, wherein Net Interest (NI) is calculated where summations are over the possible balance variables for the object, according to:

Int Inc($o_i$)=$\Sigma AB_{(asset\ c,t)}(o_i)$*rate$_{(asset\ c,t)}(o_i)$ only if object attribute doesn't exist, $-COF(o_i)=\Sigma AB_{(asset\ c,t)}(o_i)*R_{(asset,t)}(type_{p,a,b}(o_i))$, $-$Int Exp($o_i$)=$\Sigma AB_{(liability,t)}(o_i)$*rate$_{(liability,t)}(o_i)$) only if object attribute doesn't exist, $+VOF(o_i)=\Sigma AB_{(liability,t)}(o_i)*R_{(liability,t)}(type_{p,a,b}(o_i))$,
wherein:

$AB_{(c,t)}(o_i)$=Average Balances of the object, rate$_{(c,t)}(o_i)$=Effective interest rate for the corresponding balance amounts, type$_{p,a,b}(o_i)$=Object $o_i$'s product, object attribute, and behavior types as needed to identify treatment rate, $R_{(c,t)}(type_{p,a,b}(o_i))$=Rate (treatment rate) for objects of this product type, balance class, and tier/tenor, Int Inc($o_i$)=Interest Income of object $o_i$, COF($o_i$)=Cost of funds used by object $o_i$, Int Exp($o_i$)=Interest Expense for object $o_i$, and VOF($o_i$)=Value of funds provided by object $o_i$.

22. The process of claim 21, including the step of calculating earnings on allocated equity, where the summation is taken over all asset balances, according to:

EOAE($o_i$)=$R_{equity}$*ER*$\Sigma AB_{(asset,t)}(o_i)$, wherein:

$AB_{(asset,t)}(o_i)$=Average Asset balances of the object $o_i$, including any allocated asset balances, ER=Equity Ratio, and $R_{equity}$=Treatment Rate for equity.

23. The process of claim 21, including the step of calculating earnings on allocated equity according to:

EOAE($o_i$)=$R_{equity}$*$\Sigma$[Amount($o_i$)*$W$(Wt($o_i$))*Cap Ratio], wherein:

Amount($o_i$)=Amount(s) associated with object 'a' This may be the average asset balances of the object '$o$,' including any allocated asset balances, or may be an object parameter, Wt(type($o_i$))=Code needed to identify the weight for object o balances, at the object-type level, W(Wt(type($o_i$)))=determined by the weight code, Cap Ratio=An appropriate risk-weighted capital ratio chosen, and $R_{equity}$=Treatment Rate for equity.

24. The process of claim 21, including the step of calculating earnings on allocated equity, according to:

EOAE($o_i$)=$\Sigma R_{equity}$*$E_{cohort}(o)$(Amount($o_i$)), or $\Sigma R_{equity}$*[$\alpha+\beta$*Amount($o_i$)], wherein:

Amount($o_i$)=An amount or amounts related to the object, such as average balances of the object (denoted $AB_{(c,s,t)}(o_i)$, Cohort($o_i$)=The cohort of objects in which object o is a member, $E_{cohort}(o_i)$=The equity allocation rule for the cohort of object o, according to a linear (two-valued) function that operates on Amount($o_i$) of the form $\alpha+\beta$*Amount(o), and $R_{equity}$=Treatment Rate(s) for equity for the Amount($o_i$) value(s).

25. The process of claim 5, wherein the value for indirect expense (IE) is calculated as:

before deferral $$IE(o_i) = IE_k * \frac{F(IE_k)(o_i)}{\sum_{j}^{o_i \in O(IE)} F(IE_k)(o_i)}$$

added over each set $IE_k$ to which $o_i$ is related, $$= \sum_{k}^{o \in O(IE)} \left( IE_k * \frac{F(IE_k)(o_i)}{\sum_{j}^{o_i \in O(IE)} F(IE_k)(o_j)} \right)$$

and each of these terms is deferred over its amortization period according to any of the amortization rules (cash, straight line, declining balance, or interest amortization calculations), and where $AM_1(L,R)$ is used to denote the amortization rule and its life:

$$IE(o_i) = \sum_{k}^{o_i \in O(IE)} AM_1(L, R) \left( IE_k * \frac{F(IE_k)(o_i)}{\sum_{j}^{o_i \in O(IE)} F(IE_k)(o_j)} \right), \text{ and}$$

the result increased by the amounts with remaining amortization life for which amortization was begun in earlier periods.

26. The process of claim 4, provisioning (P) of each object is calculated according to:

$$P(o_i) = PG(o_i) * \frac{\text{Balance of } o_i}{\sum_{k}^{o_k \in RPG(o_i)} \text{Balance } o_k}, \text{ wherein:}$$

PG($o_i$) denotes the P group in which $o_i$ is a member.

27. The process of claim 4, wherein provisioning (P) is calculated as:

$$P(o_i) = PG(o_i) * \frac{\text{Balance}(o_i) * RF(o_i)}{\sum_{k}^{o_k \in RPG(o_i)} [\text{Balance}(o_k) * RF(o_k)]}, \text{ wherein:}$$

PG($o_i$) denotes the P group in which $o_i$ is a member, and

RF($o_i$) denotes the expected adjustment factor for $o_i$.

28. The process of claim 4, wherein provisioning (P) is calculated as:

$$P(o_i) = \text{Exposure}(o_i) * Pr(o_i) * \text{Expected Value Adjustment}(o_i) * \frac{1}{L_i},$$

wherein:

$Pr(o_i)$ is a probability for object $o_i$, and

L is the expected number of reporting periods during the life of $o_i$.

29. The process of claim 7, wherein the step of adjusting the measure for object level profitability is calculated as:

$$\text{Profit}(o_i) = \{[NIR(o_i) + OR(o_i) - DE(o_i) - IE(o_i) - P(o_i)] * (1 - \text{EffectiveTaxRate})\} - SVA(o_i),$$

where $$SVA(o_i) = \alpha(o_i) + \beta(o_i) * \text{Amount}(o_{ii}),$$

and $\alpha(o_i)$, $\beta(o_i)$ are functions for a cohort of objects in which $o_i$ is a member, and Amount($o_i$) is given by a rule which maps $o_i$ to a data value (such as balance, or allocated equity) also defined at the cohort level.

30. The process of claim 7, wherein the step of adjusting the measure for object level profitability includes the calculation:

$$\text{Profit}(o_i) = [NIR(o_i) + OR(o_i) - DE(o_i) - IE(o_i) - P(o_i)] * (1 - \text{EffectiveTaxRate}) \text{ where,}$$

for a two tier taxation system, Effective Tax Rate is calculated as:

Effective Tax Rate=(1−tax rate 2)*(tax rate 1)+tax rate 2.

\* \* \* \* \*

UNITED STATES PATENT AND TRADEMARK OFFICE
CERTIFICATE OF CORRECTION

| | | |
|---|---|---|
| PATENT NO. | : 7,882,137 B2 | Page 1 of 1 |
| APPLICATION NO. | : 12/401101 | |
| DATED | : February 1, 2011 | |
| INVENTOR(S) | : Richard Tad Lepman | |

It is certified that error appears in the above-identified patent and that said Letters Patent is hereby corrected as shown below:

In column 31, line 11 (claim 1), after "the" insert -- computer implemented --.

Signed and Sealed this
Twenty-third Day of August, 2011

David J. Kappos
*Director of the United States Patent and Trademark Office*